United States Patent
Hashimoto

(10) Patent No.: US 9,593,764 B2
(45) Date of Patent: Mar. 14, 2017

(54) BICYCLE COMPONENT OPERATING APPARATUS

(71) Applicant: Shimano Inc., Sakai, Osaka (JP)

(72) Inventor: Akinori Hashimoto, Osaka (JP)

(73) Assignee: Shimano Inc., Osaka (JP)

( * ) Notice: Subject to any disclaimer, the term of this patent is extended or adjusted under 35 U.S.C. 154(b) by 845 days.

(21) Appl. No.: 13/857,390

(22) Filed: Apr. 5, 2013

(65) Prior Publication Data

US 2014/0298943 A1    Oct. 9, 2014

(51) Int. Cl.
| | | |
|---|---|---|
| *B60L 1/00* | (2006.01) | |
| *B60L 3/00* | (2006.01) | |
| *H02G 3/00* | (2006.01) | |
| *F16H 59/04* | (2006.01) | |
| *B62M 25/08* | (2006.01) | |
| *B62K 23/04* | (2006.01) | |

(52) U.S. Cl.
CPC ........... *F16H 59/044* (2013.01); *B62K 23/04* (2013.01); *B62M 25/08* (2013.01); *B62K 2207/00* (2013.01); *Y10T 74/2003* (2015.01)

(58) Field of Classification Search
CPC ....... F16H 59/044; B62K 23/04; B62M 25/08

USPC .......................................................... 307/9.1
See application file for complete search history.

(56) References Cited

U.S. PATENT DOCUMENTS

| | | | |
|---|---|---|---|
| 5,903,224 A * | 5/1999 | Reynolds | G09F 21/045 340/432 |
| 8,286,529 B2 | 10/2012 | Tetsuka | |
| 2008/0098848 A1 | 5/2008 | Dal Pra' et al. | |
| 2009/0054182 A1* | 2/2009 | Miki | B62K 23/06 474/80 |
| 2010/0244401 A1* | 9/2010 | Hara | B62M 9/122 280/261 |
| 2013/0014607 A1 | 1/2013 | Miki et al. | |

FOREIGN PATENT DOCUMENTS

DE    10 2011 003 431 A1    8/2012

* cited by examiner

*Primary Examiner* — Carlos Amaya
(74) *Attorney, Agent, or Firm* — Global IP Counselors, LLP

(57) ABSTRACT

A bicycle component operating apparatus is basically provided with a controller. The controller is configured to electrically adjust an input position of at least one operating member for starting operation of at least one bicycle component.

29 Claims, 16 Drawing Sheets

```
Rear Shifter Lever
Position Setting

1st Lever         2nd Lever
 ○ +3°             ○ +3°
 ○ +2°             ● +2°
 ○ +1°             ○ +1°
 ● −Initial        ○ −Initial
 ○ −1°             ○ −1°
 ○ −2°             ○ −2°
 ○ −3°             ○ −3°
```

FIG. 5

```
Front Shifter Lever
Position Setting

1st Lever         2nd Lever
 ○ +3°             ○ +3°
 ○ +2°             ○ +2°
 ○ +1°             ○ +1°
 ○ −Initial        ○ −Initial
 ○ −1°             ○ −1°
 ● −2°             ● −2°
 ○ −3°             ○ −3°
```

FIG. 6

```
Rear Shifter Lever
Position Setting

1st Lever      2nd Lever
 [intial]       [-2.5]

Please input numeral
   from -3 to +3
```

FIG. 7

BICYCLE COMPONENT OPERATING APPARATUS

BACKGROUND

Field of the Invention

This invention generally relates to a bicycle component operating apparatus. More specifically, the present invention relates to a bicycle component operating apparatus in which an input position of an operating member for starting operation of a bicycle component is electrically adjusted.

Background Information

Bicycles are often provided with one or more bicycle components that can be operated and/or adjusted by a rider while riding. Examples of some these bicycle components include an electric suspension, an electric gear changing device (e.g., an electric derailleur or electric internally geared hub) and an electric seatpost. A bicycle component operating device is usually provided on a bicycle (e.g., on a bicycle handlebar) for a rider to electrically operate and/or adjust these bicycle electric components. These bicycle component operating devices are usually provided at least one operating member that is movable from a rest position to an operated position for starting operation of at least one bicycle component.

SUMMARY

Generally, the present disclosure is directed to various features of a bicycle component operating apparatus that is configured to operate at least one bicycle component. In most conventional bicycle component operating devices, either the user operating member is not adjustable to change an input position of the operating member for starting operation of the bicycle component or such an adjustment is done mechanically. In view of the state of the known technology, one object is to provide a bicycle component operating apparatus that is configured to electrically adjust an input position of at least one operating member for starting operation of at least one bicycle component.

In accordance with a first aspect of the present invention, a bicycle component operating apparatus is provided that basically comprises a controller. The controller is configured to electrically adjust an input position of at least one operating member for starting operation of at least one bicycle component.

In accordance with a second aspect of the present invention, the bicycle component operating apparatus according to the first aspect further comprises a position detecting member configured to detect the input position of the at least one operating member.

In accordance with a third aspect of the present invention, the bicycle component operating apparatus according to the second aspect is configured so that the position detecting member includes at least one of a tactile switch, a Hall Effect sensor and a magnetoresistive sensor.

In accordance with a fourth aspect of the present invention, the bicycle component operating apparatus according to the second aspect is configured so that the position detecting member non-physically detects the input position.

In accordance with a fifth aspect of the present invention, the bicycle component operating apparatus according to the fourth aspect is configured so that the position detecting member detects a strength of a magnetic field to detect the input position.

In accordance with a sixth aspect of the present invention, the bicycle component operating apparatus according to the fifth aspect is configured so that the controller determines the input position based on a level of the strength of the magnetic field.

In accordance with a seventh aspect of the present invention, the bicycle component operating apparatus according to the first aspect is configured so that the controller includes a user input to adjust a threshold value that corresponds to the input position, and a memory that stores a user setting of the threshold value as the input position.

In accordance with an eighth aspect of the present invention, the bicycle component operating apparatus according to the second aspect is configured so that the position detecting member includes a first sensor that detects a first operating member of the at least one operating member and a second sensor that detects a second operating member of the at least one operating member.

In accordance with a ninth aspect of the present invention, the bicycle component operating apparatus according to the eighth aspect is configured so that the first and second sensors are Hall Effect sensors.

In accordance with a tenth aspect of the present invention, the bicycle component operating apparatus according to the eighth aspect is configured so that the position detecting member further includes a third sensor that detects the first and second operating members.

In accordance with an eleventh aspect of the present invention, the bicycle component operating apparatus according to the tenth aspect is configured so that the first and second sensors are Hall Effect sensors, and the third sensor is a magnetoresistive sensor.

In accordance with a twelfth aspect of the present invention, the bicycle component operating apparatus according to the eighth aspect is configured so that the controller places the second sensor in a sleep mode based on a movement of the first operating member.

In accordance with a thirteenth aspect of the present invention, the bicycle component operating apparatus according to the tenth aspect is configured so that the controller places the second and third sensors in a sleep mode based on a movement of the first operating member.

In accordance with a fourteenth aspect of the present invention, the bicycle component operating apparatus according to the twelfth aspect is configured so that the second operating member moves the first operating member as the second operating member is moved.

In accordance with a fifteenth aspect of the present invention, the bicycle component operating apparatus according to the thirteenth aspect is configured so that the second operating member moves the first operating member as the second operating member is moved.

In accordance with a sixteenth aspect of the present invention, the bicycle component operating apparatus according to the tenth aspect is configured so that the controller is configured to electrically adjust a plurality of the input positions of the first and second operating members, respectively.

In accordance with a seventeenth aspect of the present invention, the bicycle component operating apparatus according to the sixteenth aspect is configured so that the controller determines whether the first operating member is in a first input position or a second input position based on a signal from the third sensor.

In accordance with an eighteenth aspect of the present invention, the bicycle component operating apparatus according to the seventeenth aspect is configured so that the controller determines whether the second operating member is in a third input position or a fourth input position based on a signal from the third sensor.

In accordance with a nineteenth aspect of the present invention, a bicycle component operating apparatus is provided that basically comprises a first sensor, a second sensor and a controller. The first sensor is configured to detect an input position of a first operating member. The second sensor is configured to detect an input position of a second operating member. The controller places the second sensor in a sleep mode based on a movement of the first operating member.

In accordance with a twentieth aspect of the present invention, the bicycle component operating apparatus according to the nineteenth aspect is configured so that the controller places the second sensor in a sleep mode until the first sensor detects movement of the first operating member.

In accordance with a twenty-first aspect of the present invention, the bicycle component operating apparatus according to the nineteenth aspect is configured so that the controller places the second sensor in a sleep mode until the first sensor detects the first input position of the first operating member.

In accordance with a twenty-second aspect of the present invention, the bicycle component operating apparatus according to the nineteenth aspect is configured so that the first and second sensors are non-physically contacts to the first and second operating members.

In accordance with a twenty-third aspect of the present invention, the bicycle component operating apparatus according to the nineteenth aspect is configured so that the first and second sensors are Hall Effect sensors.

In accordance with a twenty-fourth aspect of the present invention, the bicycle component operating apparatus according to the nineteenth aspect further comprises a third sensor that detects the first and second operating members.

In accordance with a twenty-fifth aspect of the present invention, the bicycle component operating apparatus according to the twenty-fourth aspect is configured so that the controller places the third sensor in a sleep mode based on the movement of the first operating member.

In accordance with a twenty-sixth aspect of the present invention, the bicycle component operating apparatus according to the twenty-fourth aspect is configured so that the controller places the third sensor in a sleep mode until the first sensor detects movement of the first operating member.

In accordance with a twenty-seventh aspect of the present invention, the bicycle component operating apparatus according to the twenty-fourth aspect is configured so that the controller placing the third sensor in a sleep mode until the first sensor detects the input position of the first operating member.

In accordance with a twenty-eighth aspect of the present invention, the bicycle component operating apparatus according to the twenty-fourth aspect is configured so that the first and second sensors are Hall Effect sensors, and the third sensor is a magnetoresistive sensor.

In accordance with a twenty-ninth aspect of the present invention, the bicycle component operating apparatus according to the nineteenth aspect is configured so that the second operating member moves the first operating member as the second operating member is moved.

In accordance with a thirtieth aspect of the present invention, the bicycle component operating apparatus according to the twenty-fourth aspect is configured so that the controller determines whether the first operating member is in a first input position or a second input position based on a signal from the third sensor.

Other objects, features, aspects and advantages of the disclosed bicycle component operating apparatus will become apparent to those skilled in the art from the following detailed description, which, taken in conjunction with the annexed drawings, discloses one embodiment of the bicycle component operating apparatus.

BRIEF DESCRIPTION OF THE DRAWINGS

Referring now to the attached drawings which form a part of this original disclosure:

FIG. 5 is a screen image for electrically adjusting an operated position of a rear shifter lever;

FIG. 6 is a screen image for electrically adjusting an operated position of a front shift lever;

FIG. 7 is an another screen image for electrically adjusting the operated position of the rear shifter lever;

DETAILED DESCRIPTION OF EMBODIMENTS

A preferred embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

Figure 1:
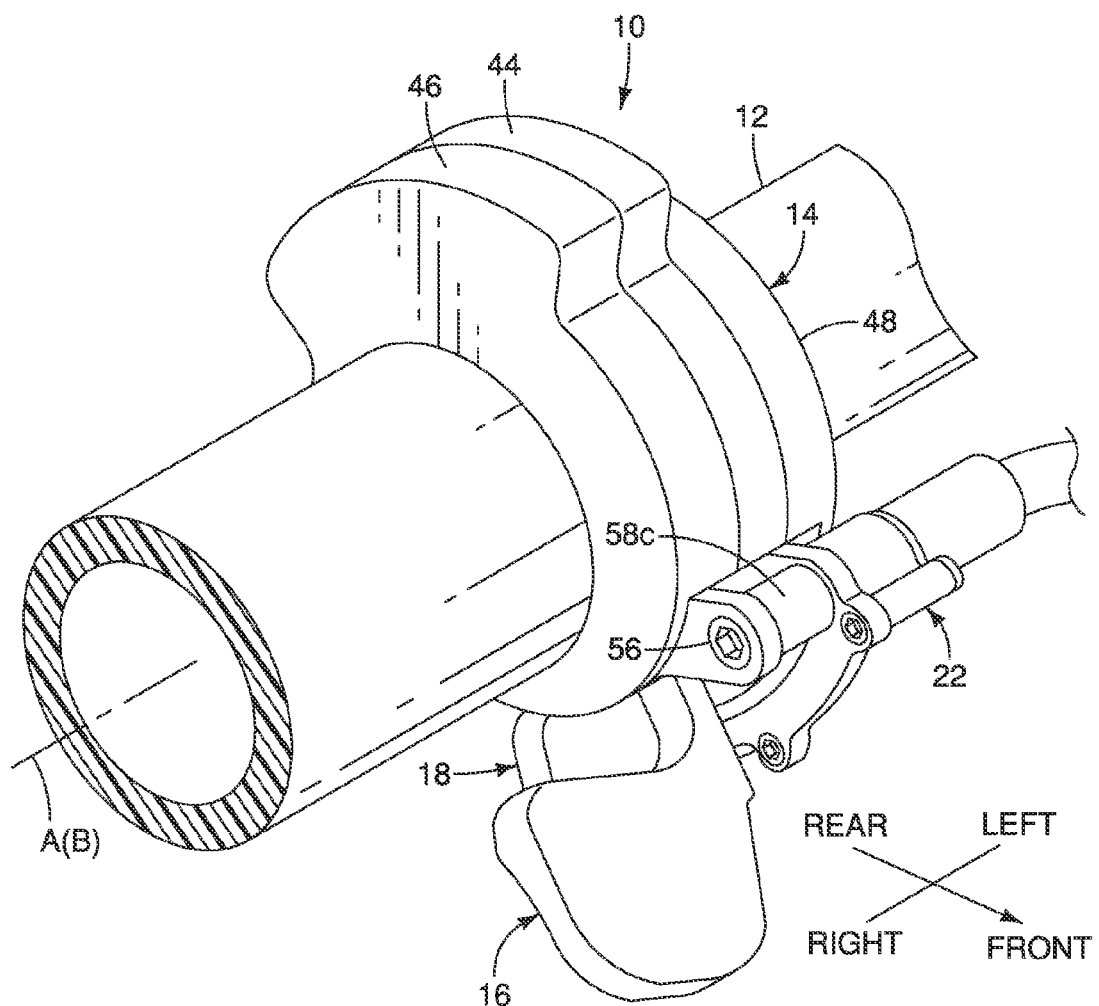
FIG. 1 is a partial perspective view of a right end of a bicycle handlebar that is equipped with a bicycle component operating apparatus in accordance with one illustrative embodiment.
Figure 2:
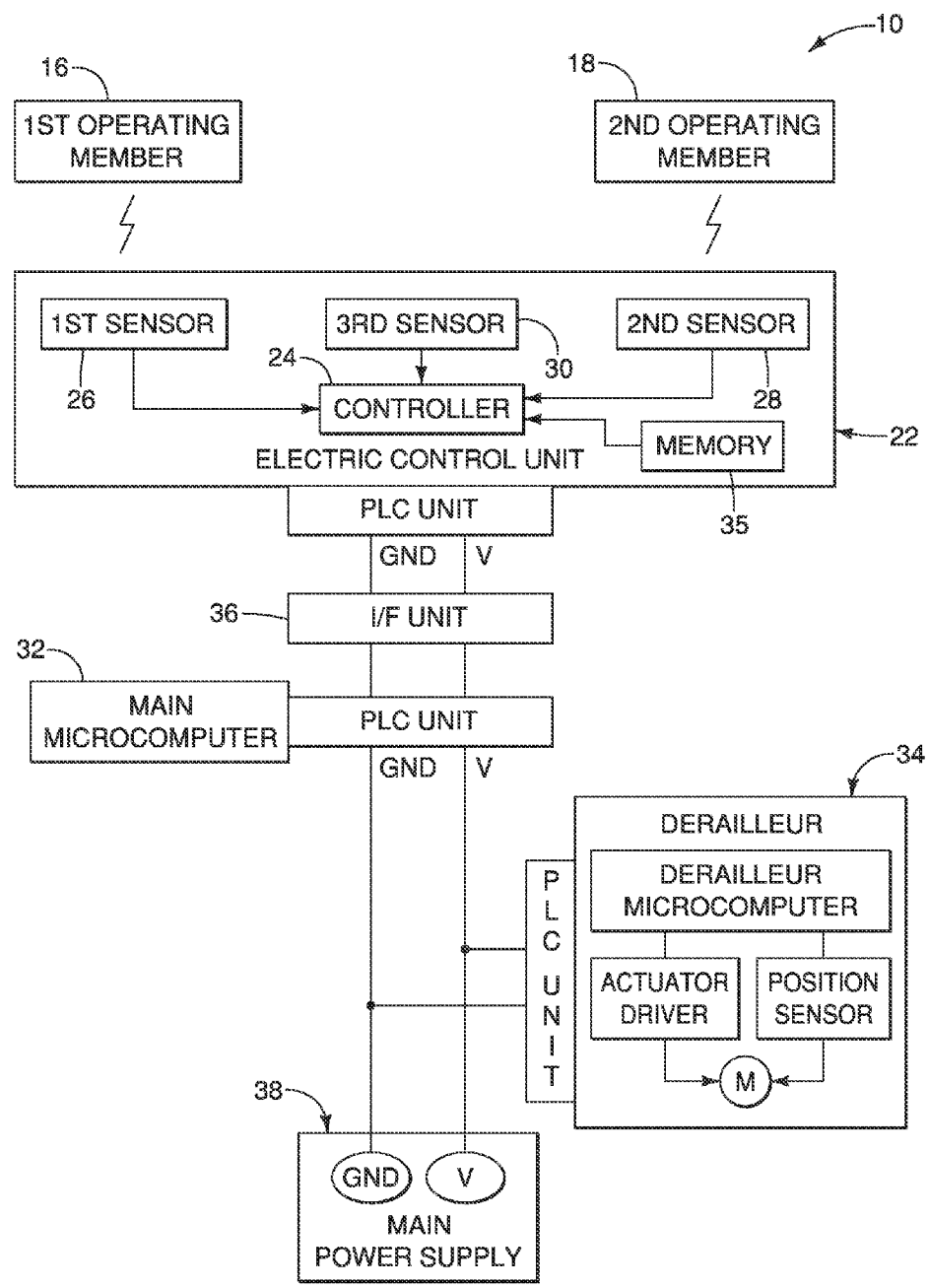
FIG. 2 is a simplified schematic block diagram showing an exemplary configuration of a bicycle control apparatus that includes the bicycle component operating apparatus illustrated in FIG. 1.
Figure 9:
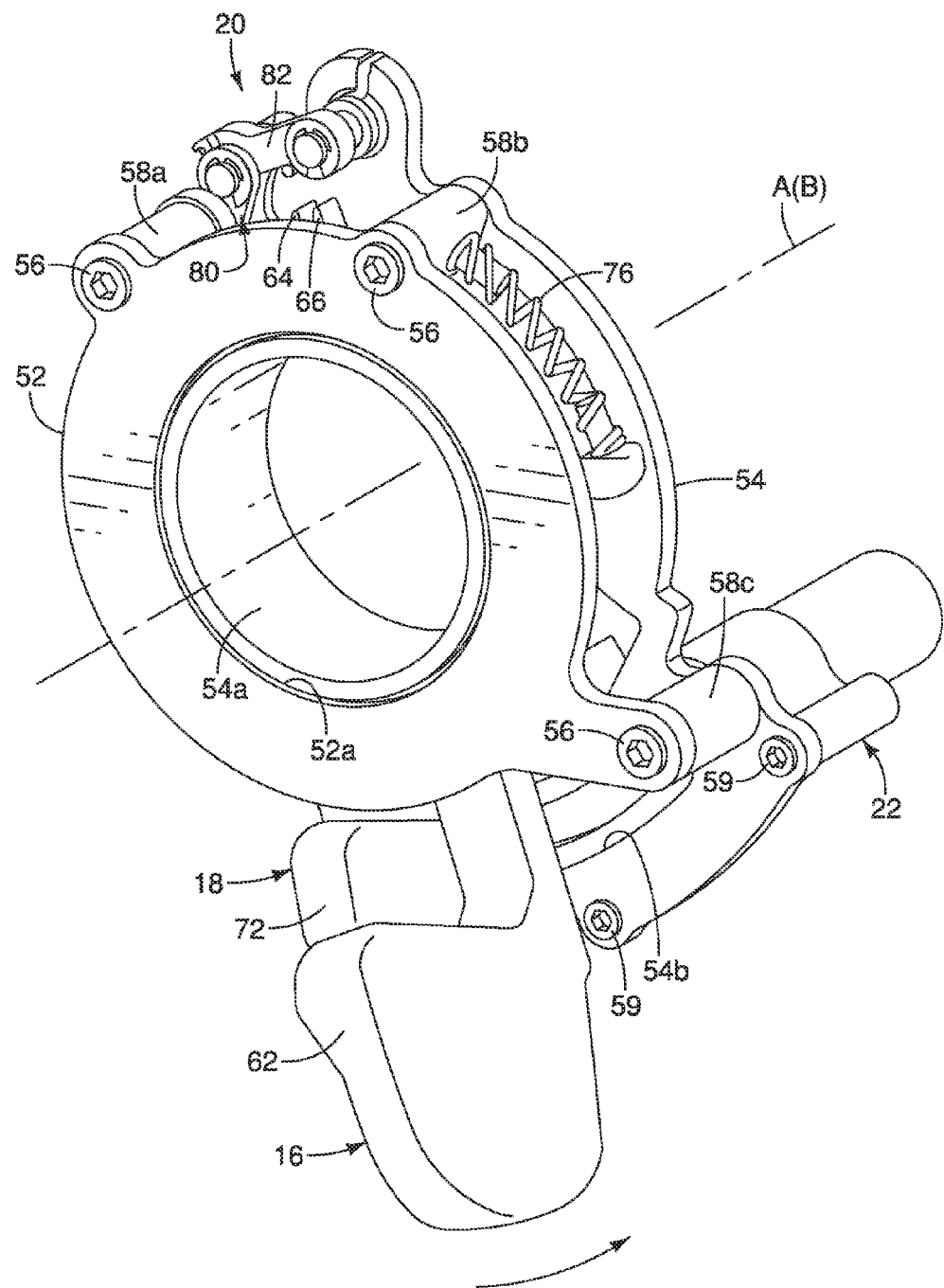
FIG. 9 is an enlarged perspective view of selected parts of the bicycle component operating apparatus illustrated in FIG. 1 with a housing and a handlebar clamp removed.
Figure 10:
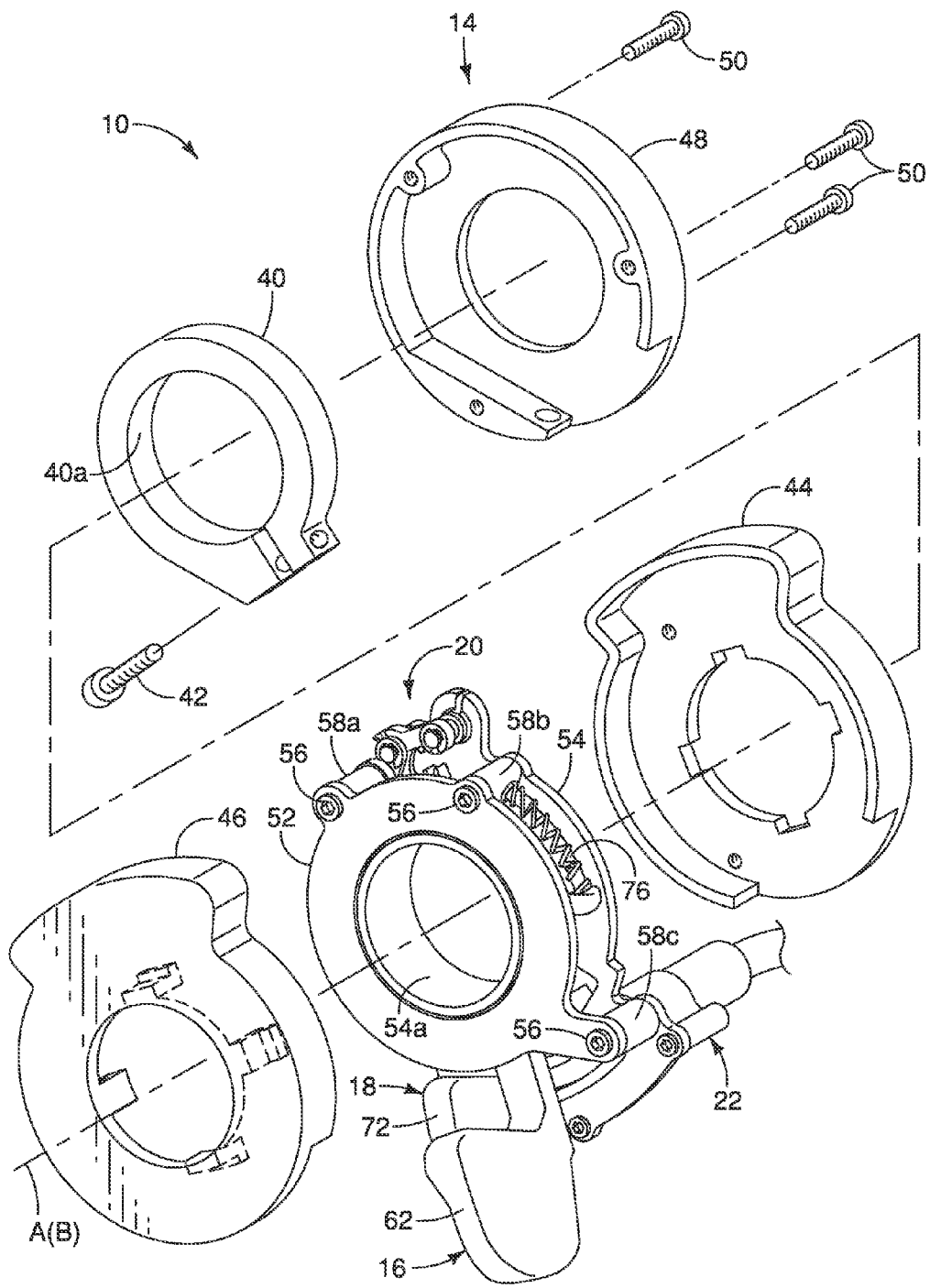
FIG. 10 is an exploded perspective view of the bicycle component operating apparatus illustrated in FIG. 1.

Referring initially to FIGS. 1 and 2, a bicycle component operating apparatus 10 is illustrated in accordance with one illustrative embodiment. The bicycle component operating apparatus 10 is mounted on a bicycle handlebar 12 having a handlebar axis A as seen in FIG. 1. As seen in FIG. 2, the bicycle component operating apparatus 10 is a part of a bicycle control apparatus, which for example in the illustrated embodiment changes a gear ratio of a bicycle drive train as discussed. The bicycle component operating apparatus 10 basically includes a base member 14, a first operating member 16 and a second operating member 18 as seen in FIG. 1. The first operating member 16 is movably supported on the base member 14 from a rest position to an operated position. The second operating member 18 is also movably supported on the base member 14 from a rest position to an operated position. In the illustrated embodiment, the second operating member 18 moves the first operating member 16 as the second operating member 18 is moved as discussed below. Furthermore, in the illustrated embodiment, as seen in FIGS. 9 and 10, the bicycle component operating apparatus 10 further includes a clicking mechanism 20 that notifies a rider of when the first and second operating members 16 and 18 have been moved to operate a bicycle electric component as discussed below.

Also in the illustrated embodiment, as shown in FIG. 2, the bicycle component operating apparatus 10 further includes an electric control unit 22 that is operated by movement of each of the first and second operating members 16 and 18. Since the bicycle component operating apparatus 10 is provided with the electric control unit 22, the bicycle component operating apparatus 10 constitutes a bicycle electric operating device for electrically operating at least one of bicycle components. As will become apparent to those skilled in the art from this disclosure, certain aspects of the bicycle component operating apparatus 10, which are disclosed herein, can be used in a non-electric bicycle operating device that pulls and releases a cable in response to operation of the first and second operating members 16 and 18.

As seen in FIG. 2, the electric control unit 22 includes a controller 24, a first sensor 26 and a second sensor 28. In the illustrated embodiment, as shown in FIG. 2, the electric control unit 22 further includes a third sensor 30. Preferably, for example, the controller 24, the first sensor 26, the second sensor 28 and the third sensor 30 are integrated together on a printed circuit board PC (FIG. 12) that is mounted to the base member 14. In the illustrated embodiment, the controller 24 is disposed on the printed circuit board PC of the bicycle component operating apparatus 10 shown in FIG. 1. However, the controller 24 can be formed as a part of other portion of a bicycle, such as a part of a controller or microprocessor of a transmission or a part of a main microcomputer 32. Basically, the first sensor 26 detects operation of the first operating member 16, and outputs signals to the controller 24 based on the movement of the first operating member 16. Specifically, the first sensor 26 detects an operated position of the first operating member 16 (e.g., an input position of a first operating member, or a first input position and a second input position of a first operating member). The second sensor 28 detects operation of the second operating member 18, and outputs signals to the controller 24 based on the movement of the second operating member 18. Specifically, the second sensor 28 detects an operated position of the second operating member 18 (e.g., an input position of a second operating member, or a third input position and a fourth input position of a second operating member). The third sensor 30 detects the first and second operating members 16 and 18. In the illustrated embodiment, the first and second sensors 26 and 28 form a position detecting member that is configured to detect the operated positions of the first and second operating members 16 and 18 (e.g., an input position of at least one operating member). In other words, the position detecting member includes the first sensor 26 that detects the first operating member 16 (e.g., at least one operating member) and the second sensor 28 that detects the second operating member 18 (e.g., at least one operating member). Furthermore, in the illustrated embodiment, the position detecting member further includes the third sensor 30 that detects the first and second operating members 16 and 18. The electric control unit 22 further includes conventional components such as an input interface circuit, an output interface circuit, and storage devices such as a ROM (Read Only Memory) device and a RAM (Random Access Memory) device as needed and/or desired. It will be apparent to those skilled in the art from this disclosure that the precise structure and algorithms for the electric control unit 22 can be any combination of hardware and software that will carry out the functions of the present invention.

Figure 3:
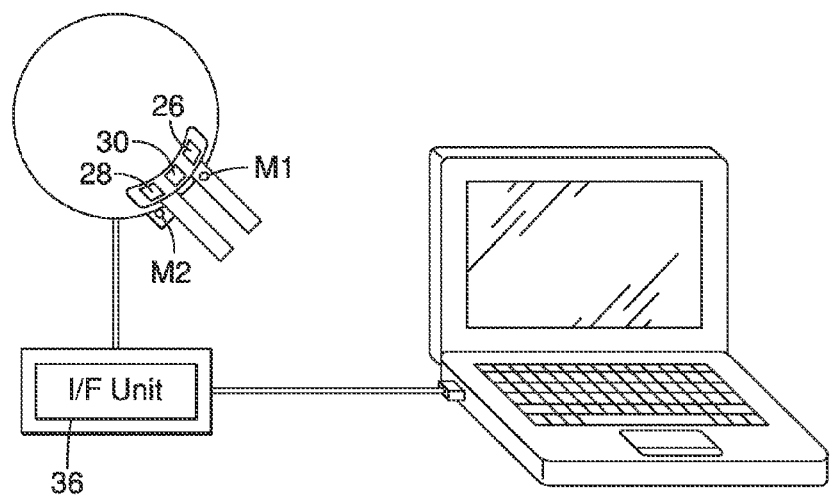
FIG. 3 is a simplified schematic diagram of the bicycle component operating apparatus illustrated in FIG. 1, illustrating an exemplary configuration for electrically adjusting input positions of first and second operating members for starting operation of a bicycle component.
Figure 11:
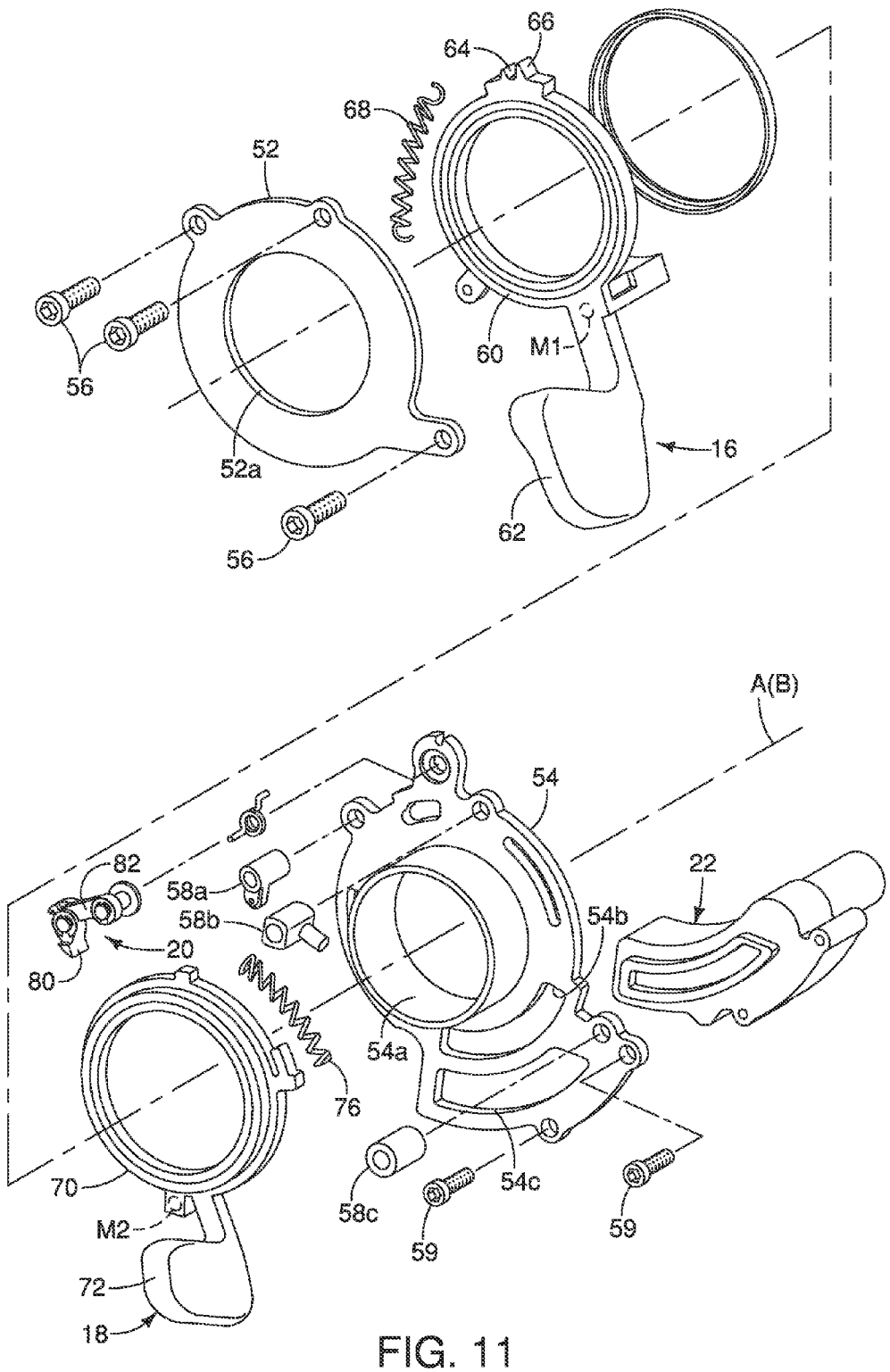
FIG. 11 is a further exploded perspective view of the selected parts of the bicycle component operating apparatus illustrated in FIG. 9.

In the illustrated embodiment, the first and second sensors 26 and 28 wirelessly or non-physically detect the operation of the first and second operating members 16 and 18. In other words, the first and second sensors 26 and 28 are non-physically contacts to the first and second operating members 16 and 18. In the illustrated embodiment, the first and second sensors 26 and 28 are Hall Effect sensors (Hall IC) which include a Hall Effect element, and a comparator. The first and second sensors 26 and 28 output a first signal (e.g. H-signal) when Hall Effect element detects the strength of magnet field is equal or larger than a predetermined value, and a second signal (e.g. L-signal) when Hall Effect element detects the strength of magnet field is smaller than the predetermined value. Specifically, as illustrated in FIGS. 3 and 11, the first operating member 16 has a magnet M1 and the second operating member 18 has a magnet M2. In the illustrated embodiment, the first sensor 26 detects the strength of the magnetic field of the magnet M1 of the first operating members 16. The second sensor 28 detects strength of the magnetic field of the magnet M1 of the second operating members 18. In other words, in the illustrated embodiment, the position detecting member of the present application detects the strength of a magnetic field to detect the operated positions (e.g., input positions). Also, the position detecting member can non-physically detect the operated positions of the first and second operating members 16 and 18 (e.g., an input position of at least one operating member). However, the first and second sensors 26 and 28 can be, for example, resistive position sensors, optical position sensors, magnetoresistive sensors, etc. Furthermore, other types of position sensing arrangements can be utilized as needed and/or desired. For example, the first and second sensors 26 and 28 could be electrically connected to the first and second operating members 16 and 18, respectively, by using contacts and brushes and/or using wires in a conventional manner. Furthermore, the first and second sensors 26 and 28 can be tactile switches. Thus, in the illustrated embodiment, the position detecting member can include at least one of a tactile switch, a Hall Effect sensor and a magnetoresistive sensor.

Furthermore, in the illustrated embodiment, the third sensor 30 wirelessly or non-physically detects the first and second operating members 16 and 18. Specifically, in the illustrated embodiment, the third sensor 30 is a magnetoresistive sensor. The third sensor 30 detects positions of the first and second operating members 16 and 18, or movements of the first and second operating members 16 and 18. Specifically, in the illustrated embodiment, the third sensor 30 is arranged to detect vector of a magnetic field of the magnet M1. Of course, the third sensor 30 can be arranged to detect a magnet other than the magnet M1. Of course, the third sensor 30 can be other type of sensors, such as a resistive position sensor, an optical position sensor, a Hall Effect sensor, or other MR sensor. Furthermore, other types of position sensing arrangements can be utilized as needed and/or desired.

The simplified schematic block diagram of FIG. 2 illustrates one example of the bicycle control apparatus that includes the bicycle component operating apparatus 10. The bicycle control apparatus includes the main microcomputer 32 that is mounted on a portion of a bicycle in a conventional manner. The main microcomputer 32 further includes a central processing unit (CPU) and conventional components such as an input interface circuit, an output interface circuit, and storage devices such as a ROM (Read Only Memory) device and a RAM (Random Access Memory) device as needed and/or desired. It will be apparent to those skilled in the art from this disclosure that the precise structure and algorithms for the main microcomputer 32 can be any combination of hardware and software that will carry out the functions of the present invention. In the illustrated embodiment, the main microcomputer 32 is configured to receive signals and process the signals to at least control an electrically operable derailleur 34. The derailleur 34 can be either a front derailleur or a rear derailleur. Since electrically operable derailleurs are well known in the bicycle field, details of the electrically operable derailleur 34 have been omitted for the sake of brevity.

The main microcomputer 32 is programmed to selectively change shift the derailleur 34 in response to a manual input from a rider operating the first and second operating members 16 and 18 or an automatic input from a control program in the main microcomputer 32. In other words, the main microcomputer 32 is configured to selectively change a gear position of the derailleur 34 either manually or automatically.

The bicycle control apparatus further includes a main power supply 38 (e.g., a battery or capacitor as shown) for supplying electrical power to the electric control unit 22 of the bicycle component operating apparatus 10, the main microcomputer 32 and the derailleur 34. However, the main power supply 38 is not limited to a battery as a power source. Rather, for example, a generator by itself or a generator with a battery can be used for the main power supply 38. Also the various components of the bicycle control apparatus can be provided with their own individually battery or capacitor instead of receiving power from the main power supply 38.

Here, in the illustrated embodiment, the electric control unit 22 of the bicycle component operating apparatus 10 and the derailleur 34 are electrically connected to the main microcomputer 32 by electrical cables that transmit control signals using signal lines S and the transmit power using conductive lines GND and V. However, the main microcomputer 32 can execute two-way communications using electric power line communications (PLC) if needed and/or desired. Moreover, wireless communications could be used to transmit control signals between the main microcomputer 32 and the electric control unit 22 of the bicycle component operating apparatus 10 and/or between the main microcomputer 32 and the derailleur 34 if needed and/or desired.

Depending on the configuration of the bicycle, the main microcomputer 32 can also receive signals from one or more additional bicycle component operating apparatuses, and thus, can further be configured to control other bicycle components such as an additional electrically operable derailleur, an additional electrically adjustable suspension and an electrically adjustable seatpost.

In the illustrated embodiment, as explained below, the first operating member 16 has two operated positions that each causes the electric control unit 22 to generate control signals. Likewise, as explained below, the second operating member 18 has two operated positions that each causes the electric control unit 22 to generate control signals. Specifically, the electric control unit 22 generates a first control signal as the first operating member 16 reaches a first operated position (FIG. 16) (e.g., a second input position) and generates a second control signal as the second operating member 18 reaches a second operated position (FIG. 18) (e.g., a fourth input position). The electric control unit 22 generates a third control signal as the first operating member 16 reaches a first intermediate position (FIG. 15) (e.g., a first input position) and generates a fourth control signal as the second operating member 18 reaches a second intermediate position (FIG. 17) (e.g., a third input position). In particular, in the illustrated embodiment, the controller 24 of the electric control unit 22 determines whether the first operating member 16 is in the first intermediate position (FIG. 15) (e.g., a first input position) or the first operated position (FIG. 16) (e.g., the second input position) based on a signal from the third sensor 30. Furthermore, the controller 24 of the electric control unit 22 determines whether the second operating member 18 is in the second intermediate position (FIG. 17) (e.g., the third input position) or the second operated position (FIG. 18) (e.g., a fourth input position) based on a signal from the third sensor 30.

Figure 4:
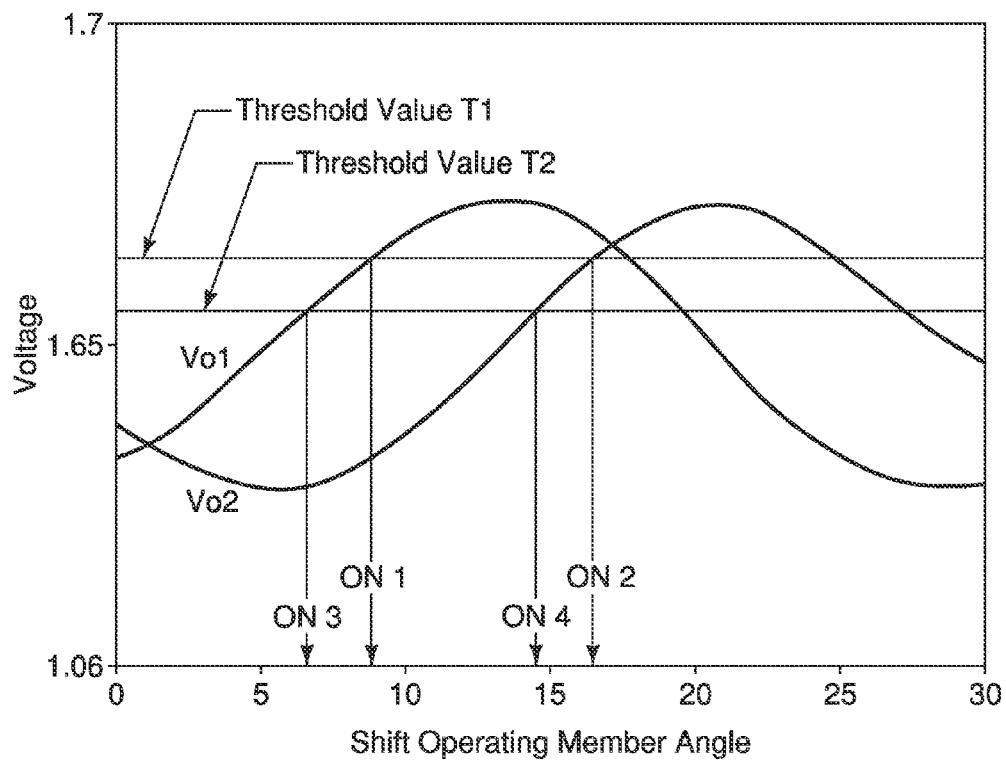
FIG. 4 is a graph showing relations between shift operating member angles and output voltages of third sensors of the bicycle component operating apparatus illustrated in FIG. 1.

Specifically, in the illustrated embodiment, as illustrated in FIGS. 14 to 18, while the first operating member 16 moves from a first rest position (FIG. 14) towards the first operated position (FIG. 16) via the first intermediate position (FIG. 15), the positional relationship between the first sensor 26 and the magnet M1 on the first operating member 16 also changes. This causes a change in an output voltage Vo1 and an output voltage Vo2 of the third sensor 30 as illustrated in FIG. 4. The third sensor 30 detects two directions (e.g. orthogonal each other) of the magnetic fields and the outputs the output voltages Vo1 and Vo2. The output voltages Vo1 and Vo2 are changed based on the strength of the magnet field of the magnet M1. In other word, the output voltages Vo1 and Vo2 are changed based on the relative positions between the third sensor 30 and the magnet M1.

In the illustrated embodiment, the controller 24 of the electric control unit 22 determines the operated positions (e.g., input positions) of the first and second operating members 16 and 18 based on levels of the strength of the magnetic fields. In particular, the controller 24 of the electric control unit 22 determines whether the first operating member 16 is in the first intermediate position (FIG. 15) (e.g., a first input position) or the first operated position (FIG. 16) (e.g., the second input position) based on the output signal of the first sensor 26 and the output voltages Vo1 and Vo2 from the third sensor 30. When only the first operating member 16 is moved, the first sensor 26 outputs a first signal (e.g. H-signal) and the second sensor 28 does not output a first signal, but rather outputs a second signal (e.g. L-signal). When both the first and second operating members 16 and 18 are moved, the first sensor 26 outputs a first signal (e.g. H-signal) and the second sensor 28 outputs a first signal (e.g. H-signal). The third sensor 30 non-distinctly detects both the movements of the first operating member 16 and the second operating member 18, but the controller 24 can determine which of the first and second operating members 16 and 18 are operated based on the signals from the first sensor 26 and the second sensor 28. In the illustrated embodiment, the controller 24 determines whether the output voltages Vo1 and Vo2 are larger than a predetermined threshold value (e.g., a threshold value T1 in FIG. 4) based on the output voltages Vo1 and Vo2 from the third sensor 30. In particular, the controller 24 determines an operational direction or position of the first operating member 16 based on the signals (the output voltages Vo1 and Vo2) from the third sensor 30 and the signals from the first sensor 26 and the second sensor 28. The controller 24 can determine the operational direction or position of the first operating member 16 based on the signal from the MR sensor (i.e., the third sensor 30) in a conventional manner. As illustrated in FIG. 4, if the output voltage Vo1 becomes larger than the threshold value T1 while the first operating member 16 moves from the first rest position (FIG. 14) towards the first intermediate position (FIG. 15), then the controller 24 determines that a shift switch is turned on ("ON 1" in FIG. 4), and generates the third control signal or command corresponding to a short stroke operation of the first operating member 16. On the other hand, if the output voltage Vo2 becomes larger than the threshold value T1 while the first operating member 16 moves from the first rest position (FIG. 14) towards the first operated position (FIG. 16), then the controller 24 determines that a shift switch is turned on ("ON 2" in FIG. 4), and generates the first control signal or command corresponding to a long stroke operation of the first operating member 16. As a result, in the illustrated embodiment, the controller 24 judges a number of gears to be changed.

On the other hand, the controller 24 of the electric control unit 22 determines whether the second operating member 18 is in the second intermediate position (FIG. 17) (e.g., a third input position) or the second operated position (FIG. 18) (e.g., the fourth input position) based on the output voltages Vo1 and Vo2 of the third sensor 30 and the signals from the first sensor 26 and the second sensor 28. In the illustrated embodiment, the controller 24 determines whether the output voltages Vo1 and Vo2 are larger than a predetermined threshold value (e.g., the threshold value T1 in FIG. 4) based on the output voltages Vo1 and Vo2 from the third sensor 30. Furthermore, the controller 24 determines an operational direction or position of the second operating member 18 based on the signal from the third sensor 30. The controller 24 can determine the operational direction or position of the second operating member 18 based on the signal from the MR sensor (i.e., the third sensor 30) in a conventional manner. In the illustrated embodiment, since the first and second operating members 16 and 18 move together as the second operating member 18 is moved, the controller 24 can determine the operational direction or position of the second operating member 18 by detecting the position of the first operating member 16 based on the signal from the first sensor 26 and the second sensor 28. As illustrated in FIG. 4, if the output voltage Vo1 becomes larger than the threshold value T1 while the second operating member 18 moves from the second rest position (FIG. 14) towards the second intermediate position (FIG. 17), then the controller 24 determines that a shift switch is turned on ("ON 1" in FIG. 4), and generates the fourth control signal or command corresponding to a short stroke operation of the second operating member 18. On the other hand, if the output voltage Vo2 becomes larger than the threshold value T1 while the second operating member 18 moves from the second rest position (FIG. 14) towards the second operated position (FIG. 18), then the controller 24 determines that a shift switch is turned on ("ON 2" in FIG. 4), and generates the second control signal or command corresponding to a long stroke operation of the second operating member 18. As a result, in the illustrated embodiment, the controller 24 judges a number of gears to be changed.

In the illustrated embodiment, as illustrated in FIG. 4, the controller 24 is configured to electrically adjust the operated positions of the first and second operating members 16 and 18 (e.g., an input position of at least one operating member) for starting operation of the bicycle components (e.g., at least one bicycle component). Specifically, as illustrated in FIG. 4, the controller 24 is configured to electrically adjust the first and second intermediate positions (FIGS. 15 and 17) and the first and second operated positions (FIGS. 16 and 18) (e.g., a plurality of the input positions) of the first and second operating members 16 and 18, respectively. More specifically, in the illustrated embodiment, the controller 24 electrically adjusts the operated positions of the first and second operating members 16 and 18 by adjusting the predetermined threshold value. Specifically, as illustrated in FIG. 4, if the threshold value T1 is changed to a predetermined threshold value T2 that is smaller than the threshold value T1, then the operated positions of the first and second operating members 16 and 18 for starting operation of the bicycle components are changed. Specifically, as shown in FIG. 4, the timing on which the controller 24 determines that the shift switch is turned on by the short stroke operation of the first operating member 16 or the second operating member 18 is changed from the timing "ON 1" to the timing "ON 3" as the threshold value T1 is changed to the threshold value T2. Furthermore, the timing on which the controller 24 determines that the shift switch is turned on by the long stroke operation of the first operating member 16 or the second operating member 18 is changed from the timing "ON 2" to the timing "ON 4" as the threshold value T1 is changed to the threshold value T2. In other words, the angular positions of the first and second operating members 16 and 18 that correspond to the first and second intermediate positions (FIGS. 15 and 17) or the first and second operated positions (FIGS. 16 and 18), respectively, can be electrically adjusted. Since the adjustments of these operated positions of the first and second operating members 16 and 18 can be electrically performed, there is no need to provide a mechanical adjustment structure to the bicycle component operating apparatus 10. Thus, the weight of the bicycle component operating apparatus 10 can be prevented from being increased.

In the illustrated embodiment, as shown in FIG. 4, the controller 24 of the electric control unit 22 determines the operated positions of the first and second operating members 16 and 18 based on the same threshold value T1 (or T2). However, the controller 24 can determines the operated positions of the first and second operating members 16 and 18 based on different threshold values, respectively. Specifically, the controller 24 of the electric control unit 22 can determine the first and second intermediate positions based on different threshold values, such as threshold values T1 and T2 (or vice versa), respectively. The controller 24 of the electric control unit 22 can determine the first and second operated positions based on different threshold values, such as the threshold values T1 and T2 (or vice versa), respectively. Furthermore, the controller 24 of the electric control unit 22 can determine the first intermediate position and the first operated position based on different threshold values, such as the threshold values T1 and T2 (or vice versa), respectively. The controller 24 of the electric control unit 22 can determine the second intermediate position and the second operated position based on different threshold values, such as the threshold values T1 and T2 (or vice versa), respectively. In this case, the controller 24 can electrically and independently adjust the operated positions of the first and second operating members 16 and 18. Thus, the angular positions of the first and second operating members 16 and 18 that correspond to the first and second intermediate positions (FIGS. 15 and 17) or the first and second operated positions (FIGS. 16 and 18), respectively, can be independently adjusted.

Referring now to FIGS. 2 to 7, the adjustments of the operated positions of the first and second operating members 16 and 18 will further be described. As illustrated in FIG. 2, the electric control unit 22 further includes a memory 35 and an I/F unit 36 (e.g., a user input). The memory 35 stores a user setting of the predetermined threshold value (e.g., the threshold value T1 or T2 in FIG. 4) as the operated positions (e.g., input positions) of the first and second operating members 16 and 18. The memory 35 includes a nonvolatile memory, and is mounted on a printed circuit board PC with the controller 24, the first sensor 26, the second sensor 28 and the third sensor 30. The I/F unit 36 is provided to adjust the predetermined threshold value that corresponds to the operated positions (e.g., input positions) of the first and second operating members 16 and 18. In the illustrated embodiment, as shown in FIG. 2, the I/F unit 36 is electrically disposed between the electric control unit 22 and the main microcomputer 32. As illustrated in FIG. 3, the bicycle component operating apparatus 10 is electrically coupled to an external device, such as a personal computer, a cycle computer, and the like, via the I/F unit 36 for setting the predetermined threshold value as the operated positions (e.g., input positions) of the first and second operating members 16 and 18. The I/F unit 36 electrically connecting the bicycle component operating apparatus 10 with a personal computer is discussed in U.S. Patent Application Publication 2013/0030603. Thus, detailed configuration of the I/F unit 36 will be omitted for the sake of brevity. In the illustrated embodiment, the memory 35 and the I/F unit 36 are formed as a part of the electric control unit 22. However, the memory 35 and the I/F unit 36 can be formed as a part of the controller 24. In other words, the controller 24 can include the memory 35 and the I/F unit 36.

As illustrated in FIGS. 5 to 7, the predetermined threshold value is set through a graphical user interface of an application software for setting the predetermined threshold value. Specifically, the application software displays position setting screens as illustrated in FIGS. 5 to 7 on a display of the personal computer or a cycle computer. The user can select an adjustment value (or shift amount) of angular positions of the first and second operating members 16 and 18 relative to initial angular positions by using a mouse or key board of the personal computer. Of course, these selections can be made by using a touch panel screen of the personal computer or input buttons of the cycle computer. FIG. 5 illustrates a case in which the first and second operating members 16 and 18 are used as a rear shifter for a rear derailleur of the bicycle. FIG. 6 illustrates a case in which the first and second operating members 16 and 18 are used as a front shifter for a front derailleur of the bicycle. As shown in FIGS. 5 and 6, the operated positions of the first and second operating members 16 and 18 (e.g., the first and second intermediate positions and/or the first and second operated positions) are independently adjustable by one degree. The controller 24 converts the adjustment values inputted through the position setting screens shown in FIGS. 5 and 6 to adjustment values for the predetermined threshold values that correspond to the adjusted operated positions of the first and second operating members 16 and 18 based on the relation between the threshold value and the angular positions of the first and second operating members 16 and 18 as shown in FIG. 4. Furthermore, as shown in FIG. 7, the operated positions of the first and second operating members 16 and 18 (e.g., the first and second intermediate positions and/or the first and second operated positions) can be independently adjusted by an amount as needed or desired. In this case, the adjustment values can be inputted through the position setting screens shown in FIG. 7 for fine tuning the operated positions of the first and second operating members 16 and 18. The adjustment values can be inputted by keyboard or can be inputted through operation of the graphical user interface shown in FIG. 7.

In the illustrated embodiment, only the first sensor 26 is always turned on for detecting movement of the first operating member 16. On the other hand, the second sensor 28 and the third sensor 30 are selectively placed in a sleep or stand-by mode. With this configuration, the electrical power consumption of the bicycle component operating apparatus 10 can be reduced. As a result, the bicycle component operating apparatus 10 less frequently requires electric charging, and can be utilized for long period of time per charging. Specifically, in the illustrated embodiment, the first sensor 26 is intermittently or continuously driven for detecting the movement of the first operating member 16. In other words, the first sensor 26 is not placed in a sleep mode. On the other hand, the controller 24 of the electric control unit 22 places the second sensor 28 in a sleep mode based on the movement of the first operating member 16. Furthermore, the controller 24 places the third sensor 30 in a sleep mode based on the movement of the first operating member 16. More specifically, in the illustrated embodiment, the controller 24 places the second sensor 28 in the sleep mode until the first sensor 26 detects the movement of the first operating member 16. Furthermore, the controller 24 places the third sensor 30 in the sleep mode until the first sensor 26 detects the movement of the first operating member 16.

More specifically, in response to the movement of the first operating member 16, the first sensor 26 detects the magnet M1 on the first operating member 16, which changes the output signal of the first sensor 26. As a result, the controller 24 determines the movement of the first operating member 16 based on the output signal of the first sensor 26 as a wakeup signal to the controller 24. In response to the controller 24 determining the movement of the first operating member 16, the controller 24 releases the sleep mode of the second sensor 28 and the third sensor 30 by sending wakeup signals to the second sensor 28 and the third sensor 30, respectively, or providing electric power to the second sensor 28 and the third sensor 30, respectively. As a result, the second sensor 28 is placed in a wakeup mode for detecting the movement of the second operating member 18, while the third sensor 30 is placed in a wakeup mode for detecting the positions and/or movements of the first and second operating members 16 and 18 as discussed above. Generally, the electrical power consumption of the MR sensor is larger than that of the Hall Effect sensor. Thus, in the illustrated embodiment, only one MR sensor (the third sensor 30) is used. Furthermore, the third sensor 30 is normally placed in the sleep mode, which also reduces the electric power consumption of the bicycle component operating apparatus 10. With only one MR sensor, the controller 24 can not determine which of the first and second operating members 16 and 18 is being operated. Thus, the Hall ICs (first and second sensors 26 and 28) are used to determine which of the first and second operating members 16 and 18 is being operated. Furthermore, the second sensor 28 is normally placed in the sleep mode, which also reduces the electric power consumption of the bicycle component operating apparatus 10.

Figure 8:
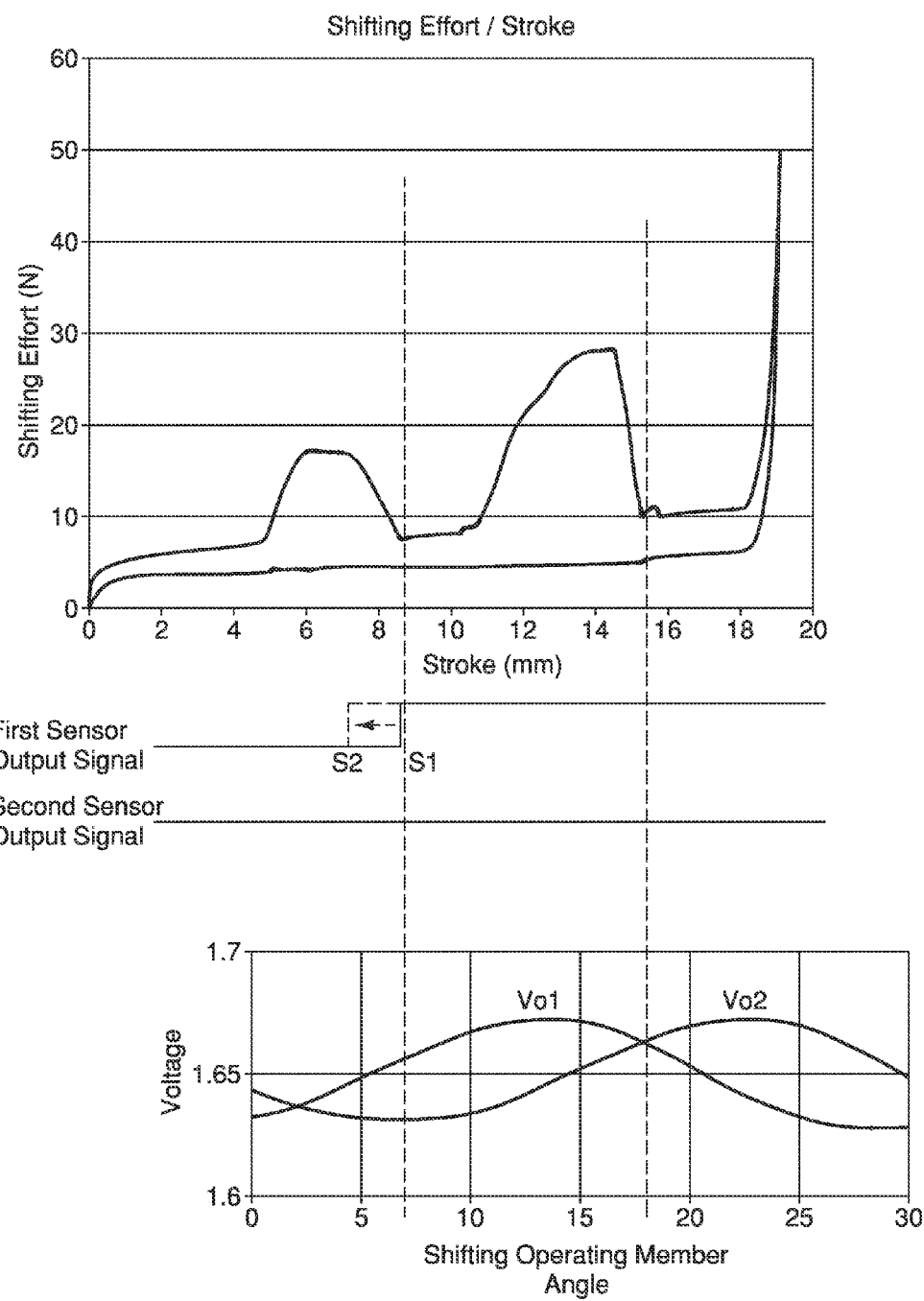
FIG. 8 is a diagram showing relations between operation of the first operating member and sensor output signals of the first and second sensors of the bicycle component operating apparatus.

In the illustrated embodiment, as explained above, when the first operating member 16 is operated, only the first operating member 16 moves, and the second operating member 18 is stationary. On the other hand, when the second operating member 18 is operated, the first operating member 16 also moves together with the second operating member 18. Thus, in response to operating either the first operating member 16 or the second operating member 18, the output signal of the first sensor 26 changes, which places the second and third sensors 28 and 30 in the wakeup mode. After the second and third sensors 28 and 30 are placed in the wakeup mode, the controller 24 detects the output signal of the second sensor 28. If the output signal of the first sensor 26 becomes H-signal, but the output signal of the second sensor 28 does not become H-signal (see, e.g., FIG. 8), then the controller 24 determines the first operating member 16 is operated. On the other hand, if the output signal of the first sensor 26 becomes the H-signal, and the output signal of the second sensor 28 also becomes the H-signal, then the controller 24 determines the second operating member 18 is operated. The timings at which the signals of the first sensor 26 and the second sensor 28 are changed from the L-signal to the H-signal (or from the H-signal to the L-signal) are predetermined in advance at the time of manufacture. In FIG. 8, the output signal of the first sensor 26 are changed from the L-signal to H-signal at a predetermined position S1 of the first operating member 16, but the predetermined position can be changed from the predetermined position S1 to a predetermined position S2 by the setting of the detection area of the first sensor 26 or a threshold value of the comparator of the first sensor 26.

In the illustrated embodiment, the controller 24 determines the short stroke operation and the long stroke operation of each of the first and second operating members 16 and 18 based on the signal from the third sensor 30. Specifically, as illustrated in FIG. 8, the controller 24 of the electric control unit 22 determines whether the first operating member 16 is in the first intermediate position (FIG. 15) (e.g., a first input position) or the first operated position (FIG. 16) (e.g., the second input position) that is spaced away from the first intermediate position based on the signal from the third sensor 30. Specifically, as illustrated in FIG. 8, the shifting effort with respect to the shift stroke has two peaks due to the clicking mechanism 20 that notifies a rider of when the first and second operating members 16 and 18 have been moved to operate a bicycle electric component. In the illustrated embodiment, as shown in FIG. 8, the predetermined threshold values for detecting the first and second intermediate positions (FIGS. 15 and 17) are set such that the output voltage Vo1 become larger than the predetermined threshold value, in response to the first and second operating members 16 and 18 being operated to ride over the first peak of the shifting effort shown in FIG. 8. Furthermore, the predetermined threshold values for detecting the first and second operated positions (FIGS. 16 and 18) are set such that the output voltage Vo2 becomes larger than the predetermined threshold value, in response to the first and second operating members 16 and 18 being operated to ride over the second peak of the shifting effort shown in FIG. 8. As shown in FIG. 8, when the first operating member 16 is operated, the output voltage Vo1 changes according to the rotation of the first operating member 16. On the other hand, when the first operating member 16 is operated, the second operating member 18 is stationary, which does not change the output signal of the second sensor 28. In FIG. 8, the first and second sensor output signals (e.g., output signals) indicate binarized output signals with respect to a predetermined threshold values, respectively. The first and second sensor output signals are used in the controller 24 as flags for determining the movement of the first and second operating members 16 and 18.

As illustrated in FIG. 8, if the status of the first sensor output signal is changed from a low-level to a high-level (or "0" to "1") (a rising edge of the first sensor output signal in FIG. 8), and the status of the second sensor output signal stays at a low-level (or "0") while the first operating member 16 moves from the first rest position (FIG. 14) towards the first intermediate position (FIG. 15), then the controller 24 determines that the short stroke operation of the first operating member 16, or the long stroke operation of the first operating member 16 based on the signal from the third sensor 30. Furthermore, if the output status of the second sensor output signal is changed from a low-level to high-level (or "0" to "1") (a rising edge of the second sensor output signal) while the second operating member 18 moves from the second rest position (FIG. 14) towards the second intermediate position (FIG. 17), then the controller 24 determines that the short stroke operation of the second operating member 18 or the long stroke operation of the second operating member 18 based on the signal from the third sensor 30. Here, as mentioned above, the operational direction of the first and second operating members 16 and 18 are determined based on the signal from the third sensor 30. The controller 24 may prevent to generate a control signal after generating the control signals until the operating lever position comes back to a predetermined stroke from the first and second intermediate position or the first and second operated position based on the signal from the third sensor 30 for excluding the influence of chattering of the first and second operating members 16 and 18.

In the illustrated embodiment, the controller 24 places the second and third sensors 28 and 30 in the sleep mode, respectively, until the first sensor 26 detects the movement of the first operating member 16. However, the controller 24 can place the second and third sensors 28 and 30 in the sleep mode at different timings. For example, the controller 24 can place the second sensor 28 in the sleep mode until the first sensor 26 detects the first intermediate position (FIG. 15) (e.g., a first input position) of the first operating member 16. Furthermore, the controller 24 can place the third sensor 30 in the sleep mode until the first sensor 26 detects the first intermediate position (FIG. 15) (e.g., the first input position). Furthermore, in the illustrated embodiment, only the first sensor 26 is normally placed in the wakeup mode. However, alternatively, all of the first, second and third sensors 26, 28 and 30 can be normally placed in the wakeup mode.

Referring to FIGS. 9 to 19, the mechanical configurations of the bicycle component operating apparatus 10 will further be described in detail. As seen in FIG. 10, the base member 14 includes a fixing member 40 that is configured to be fixed to the handlebar 12 of a bicycle. As a result, the first operating member 16 is configured to rotate about the handlebar axis A while the base member 14 is attached to the bicycle handlebar (hereinafter just "handlebar") 12. Likewise, the second operating member 18 is configured to rotate about the handlebar axis A while the base member 14 is attached to the handlebar 12. In the illustrated embodiment, the fixing member 40 is a conventional tube clamp that squeezes the handlebar 12 by tightening a fixing bolt 42.

As seen in FIG. 10, the fixing member 40 of the base member 14 includes a handlebar receiving opening 40a defining a handlebar mounting axis B. The handlebar mounting axis B coincides with the handlebar axis A of the handlebar 12 when mounted to the handlebar 12. Thus, the base member 14 is configured to be attached to the handlebar 12 by the fixing member 40. In the illustrated embodiment, the base member 14 further includes a first cover member 44, a second cover member 46 and a third cover member 48. The first and second cover members 44 and 46 are snap-fitted together to form a housing that partially encloses the first and second operating members 16 and 18. The third cover member 48 is fixedly connected to the fixing member 40 by passing the fixing bolt 42 through an opening of the cover member 48. The third cover member 48 attaches the fixing member 40 to the first and second cover members 44 and 46. In this way, the first and second cover members 44 and 46 are non-rotatably fixed to the handlebar 12 by the fixing member 40. The first, second and third cover members 44, 46 and 48 are made of a suitable material such as a hard rigid plastic.

Still referring to FIG. 10, in the illustrated embodiment, the base member 14 further includes a first support member 52 and a second support member 54. The first and second support members 52 and 54 are fixed together by a plurality (three) of threaded fasteners 56. The first and second support members 52 and 54 are spaced apart by a plurality (three) of spacers 58a, 58b and 58c. The first and second operating members 16 and 18 are compactly arranged between the first and second support members 52 and 54 as an integrated unit.

Figure 12:
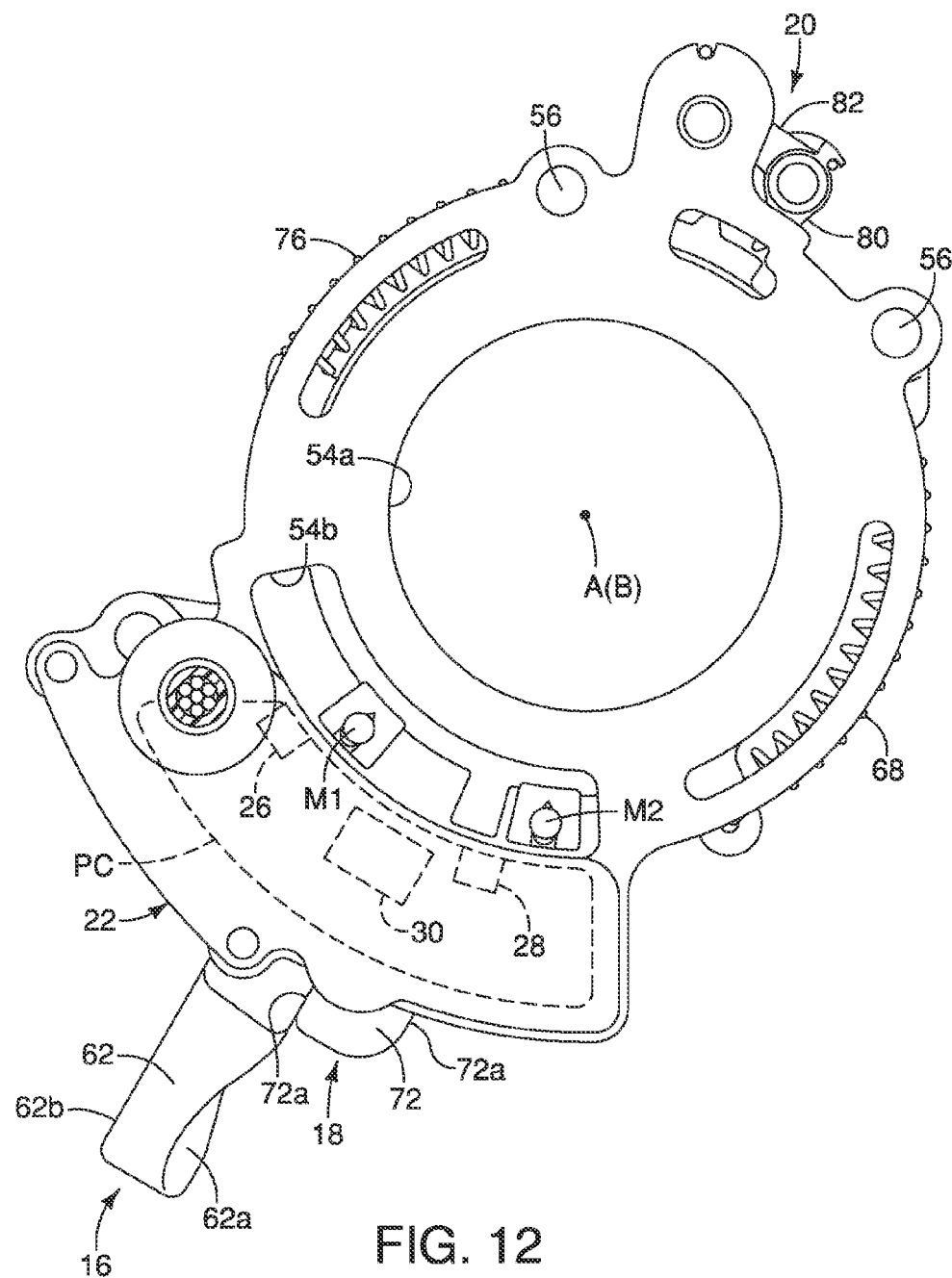
FIG. 12 is an elevational view of the selected parts of the bicycle component operating apparatus illustrated in FIGS. 9 and 11 looking from the center of the handlebar toward the right end of the handlebar.

As seen in FIGS. 9 to 12, the second support member 54 preferably has a tubular portion 54a that forms a handlebar receiving part of the base member 14. The tubular portion 54a extends into an opening 52a of the first support member 52 as seen in FIG. 9. Although not shown, preferably, two bearings provided on the tubular portion 54a for rotatably supporting the first and second operating members 16 and 18 on the tubular portion 54a. In other words, a first bearing is disposed between the first operating member 16 and the outer surface of the tubular portion 54a, and a second bearing is disposed between the second operating member 18 and the outer surface of the tubular portion 54a. As seen in FIGS. 11 and 12, the electric control unit 22 is attached to the second support member 54 by a pair of screws 59. In the illustrated embodiment, the second support member 54 preferably has an arc shaped opening 54b for receiving therethrough portions of the first and second operating members 16 and 18 that contain the magnets M1 and M2M2, respectively. Furthermore, the second support member 54 preferably has an opening 54c for receiving portion of the electric control unit 22 to further support the electric control unit 22 on the second support member 54.

Referring to FIGS. 11 to 18, the first and second operating members 16 and 18 will be now described in more detail. In the illustrated embodiment, as best seen FIG. 11, the first operating member 16 includes a first mounting part 60 and a first lever part 62 (i.e., a first user operating lever). The first mounting part 60 of the first operating member 16 includes a first projection 64 and a second projection 66 for cooperating with the clicking mechanism 20 as discussed below. As best seen FIGS. 14 to 18, the first operating member 16 is biased toward a first rest position by a biasing element 68 so as to return to the first rest position after being operated to an operated position. Similarly, in the illustrated embodiment, the second operating member 18 includes a second mounting part 70 and a second lever part 72 (i.e., a second user operating lever). The second operating member 18 is biased toward a second rest position by a biasing element 76 so as to return to the second rest position after being operated to an operated position.

As explained above, the first operating member 16 has two operated positions that each causes the electric control unit 22 to generate control signals. Likewise, as explained above, the second operating member 18 has two operated positions that each causes the electric control unit 22 to generate control signals. For example, the electric control unit 22 generates the first control signal as the first operating member 16 reaches the first operated position (FIG. 16) and generates the second control signal as the second operating member 18 reaches the second operated position (FIG. 18). The electric control unit 22 generates the third control signal as the first operating member 16 reaches the first intermediate position (FIG. 15) and generates the fourth control signal as the second operating member 18 reaches the second intermediate position (FIG. 17).

In particular, the electric control unit 22 generates the first control signal when the first operating member 16 rotates from the first rest position (FIG. 14) to the first operated position (FIG. 16), which corresponds to a fully operated position. The electric control unit 22 also generates the third control signal when the first operating member 16 rotates from the first rest position (FIG. 14) to the first intermediate position (FIG. 15), which corresponds to a partially operated position between the first rest position (FIG. 14) and the first operated position (FIG. 16). More specifically, the first operating member 16 is rotated from the first rest position (FIG. 14) by a first prescribed distance D1 to reach the first intermediate position (FIG. 15), and rotated from the first rest position (FIG. 14) by a second prescribed distance D2 to reach the first operated position (FIG. 16).

In particular, the electric control unit 22 generates the second control signal when the second operating member 18 rotates from the second rest position (FIG. 14) to the second operated position (FIG. 18), which corresponds to a fully operated position. The electric control unit 22 also generates the fourth control signal when the second operating member 18 rotates from the second rest position (FIG. 14) to the second intermediate position (FIG. 17), which corresponds to a partially operated position between the second rest position (FIG. 14) and the second operated position (FIG. 18).

In the illustrated embodiment, since both the first and second operating members 16 and 18 use the clicking mechanism 20 to notify the rider when the first and second operating members 16 and 18 have reached the operated position that cause the electric control unit 22 to generate control signals, the first and second operating members 16 and 18 are moved the same amounts to reach the operated positions. More specifically, the second operating member 18 is rotated from the second rest position (FIG. 14) by the first prescribed distance D1 to reach the second intermediate position (FIG. 17), and rotated from the second rest position (FIG. 14) by the second prescribed distance D2 to reach the second operated position (FIG. 18).

As seen in FIGS. 14 to 18, the first operating member 16 and the second operating member 18 are rotatably supported on the tubular portion 54a of the base member 14 to rotate about the handlebar mounting axis B. As a result, the first operating member 16 is configured to rotate about the handlebar axis A and the handlebar mounting axis B between the first rest position and a first operated position while the base member 14 is attached to the handlebar 12. Similarly, the second operating member 18 is configured to rotate about the handlebar axis A between a second rest position and a second operated position while the base member 14 is attached to the handlebar 12.

Figure 14:
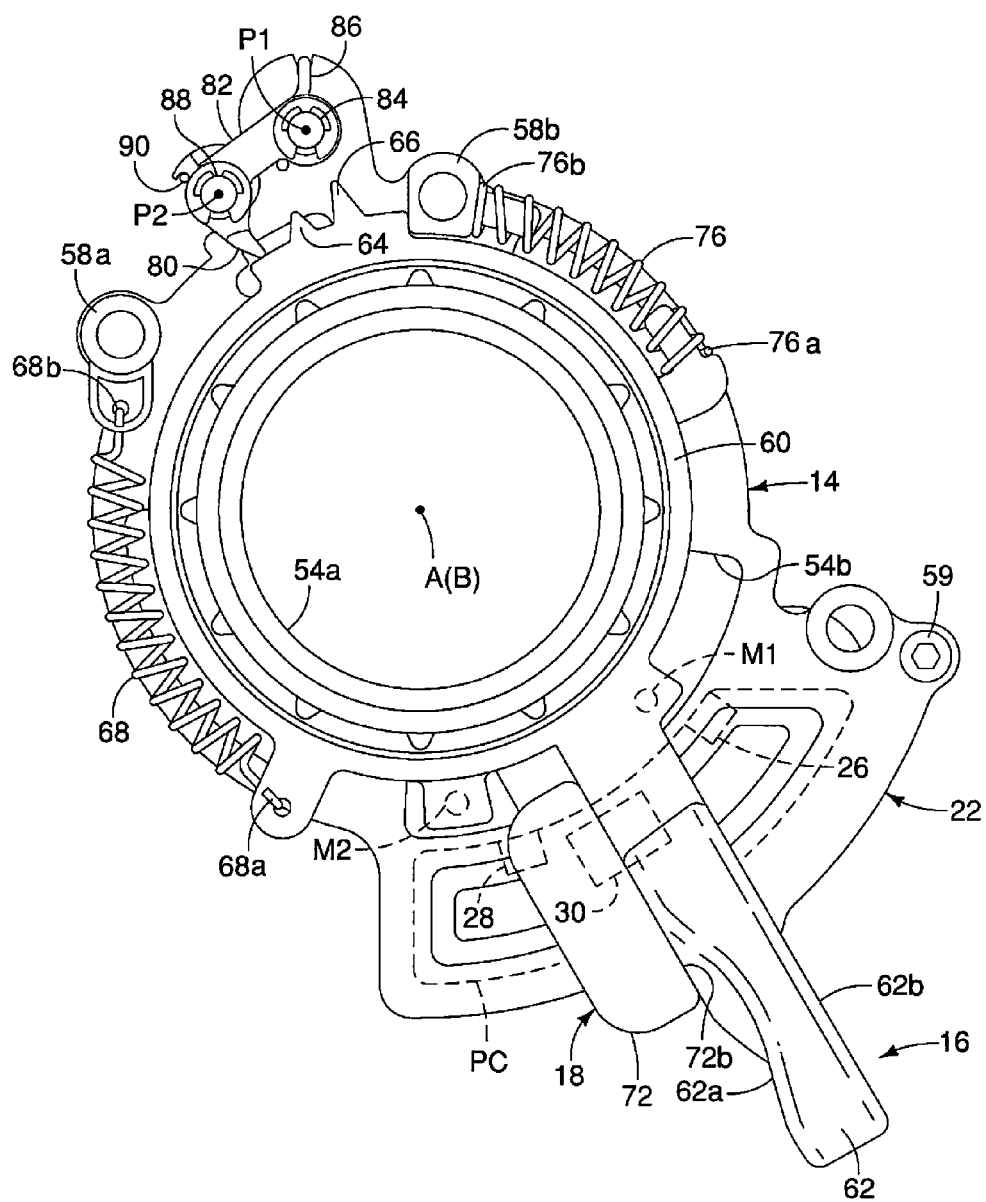
FIG. 14 is an elevational view of the selected parts of the bicycle component operating apparatus with the first and second operating members in their rest positions.
Figure 15:
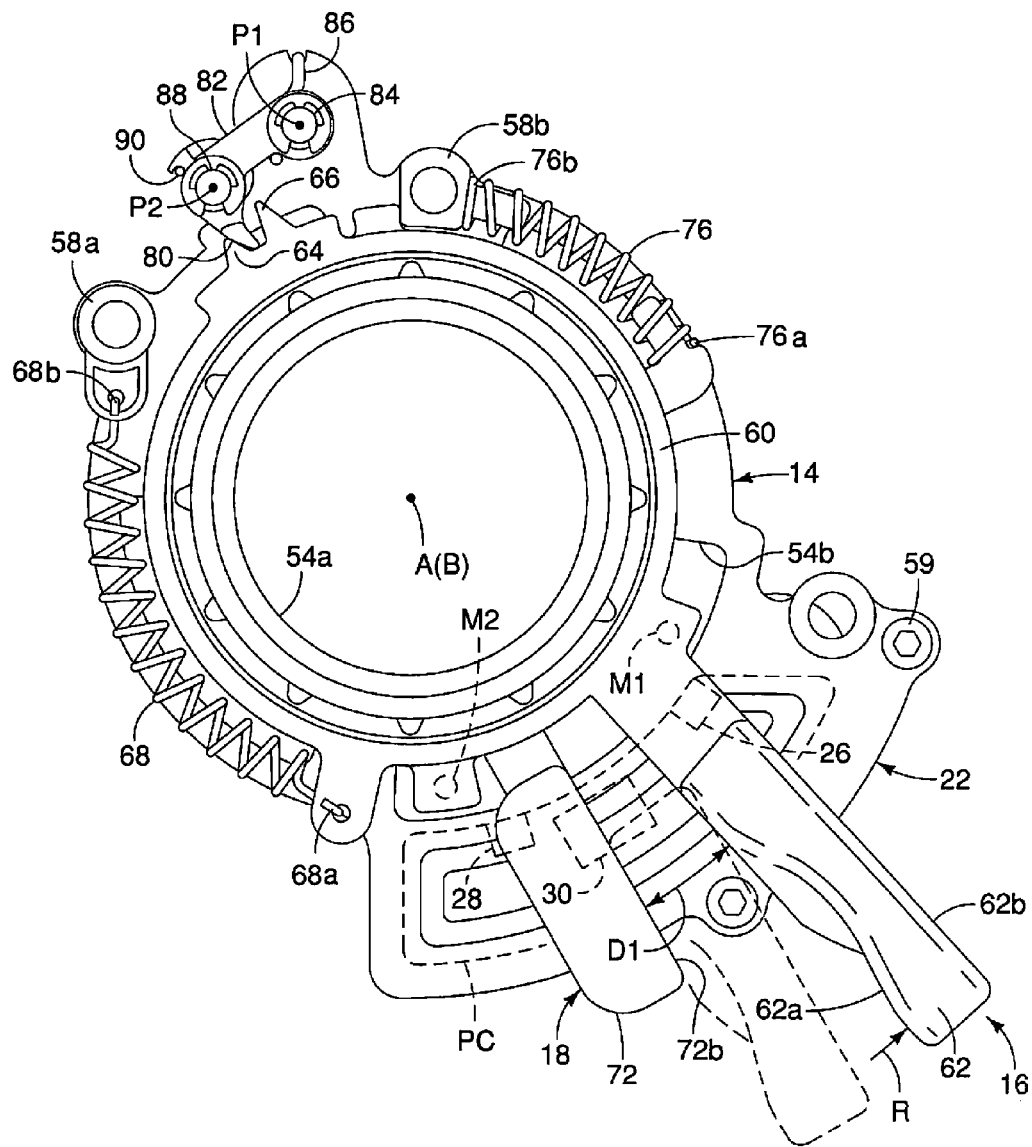
FIG. 15 is an elevational view of the selected parts of the bicycle component operating apparatus with the first operating member moved to an operated position and the second operating member in the rest position.
Figure 16:
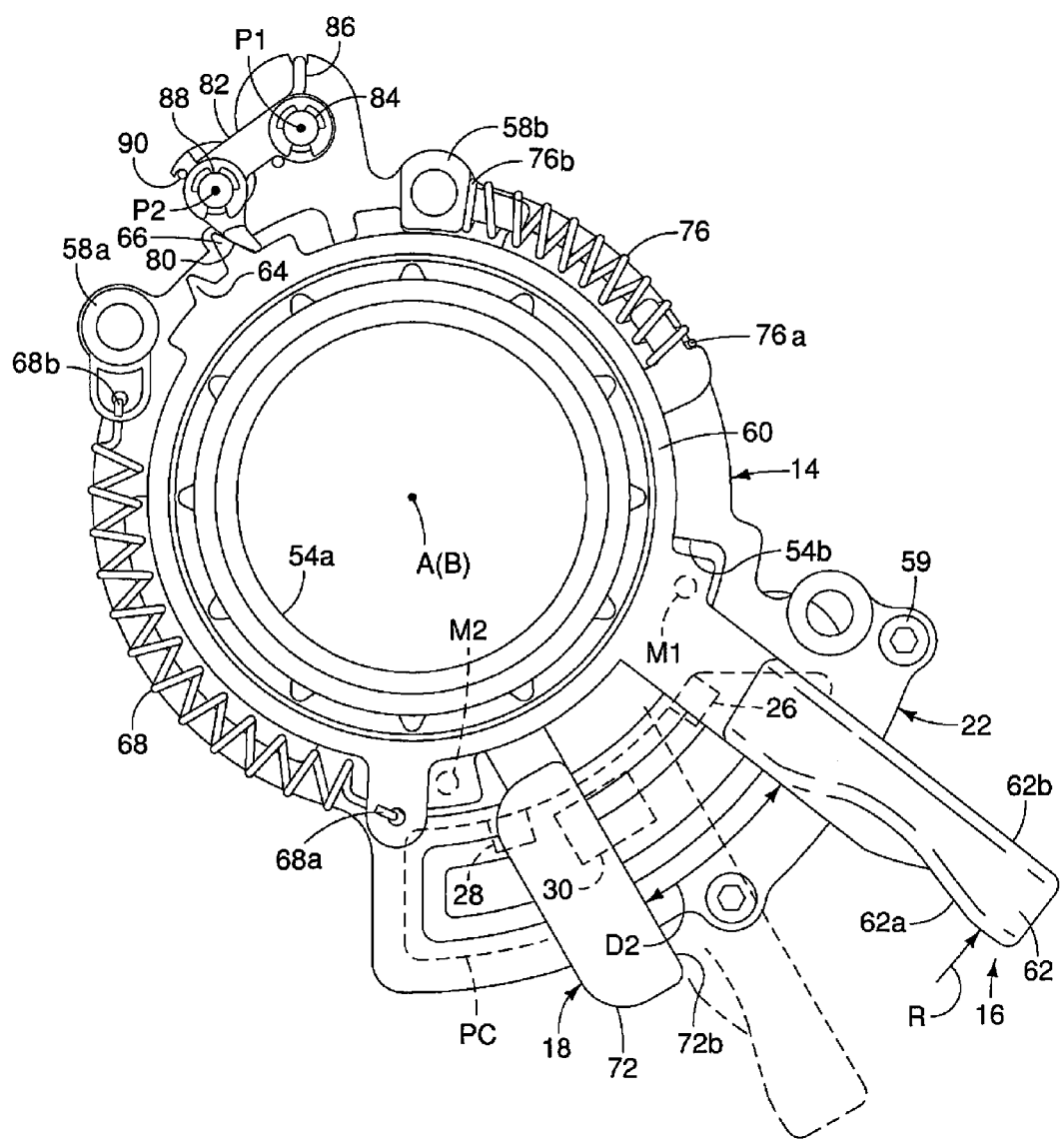
FIG. 16 is an elevational view of the selected parts of the bicycle component operating apparatus with the first operating member moved to an operated position that is further from the rest position than in FIG. 15, and the second operating member in the rest position.
Figure 17:
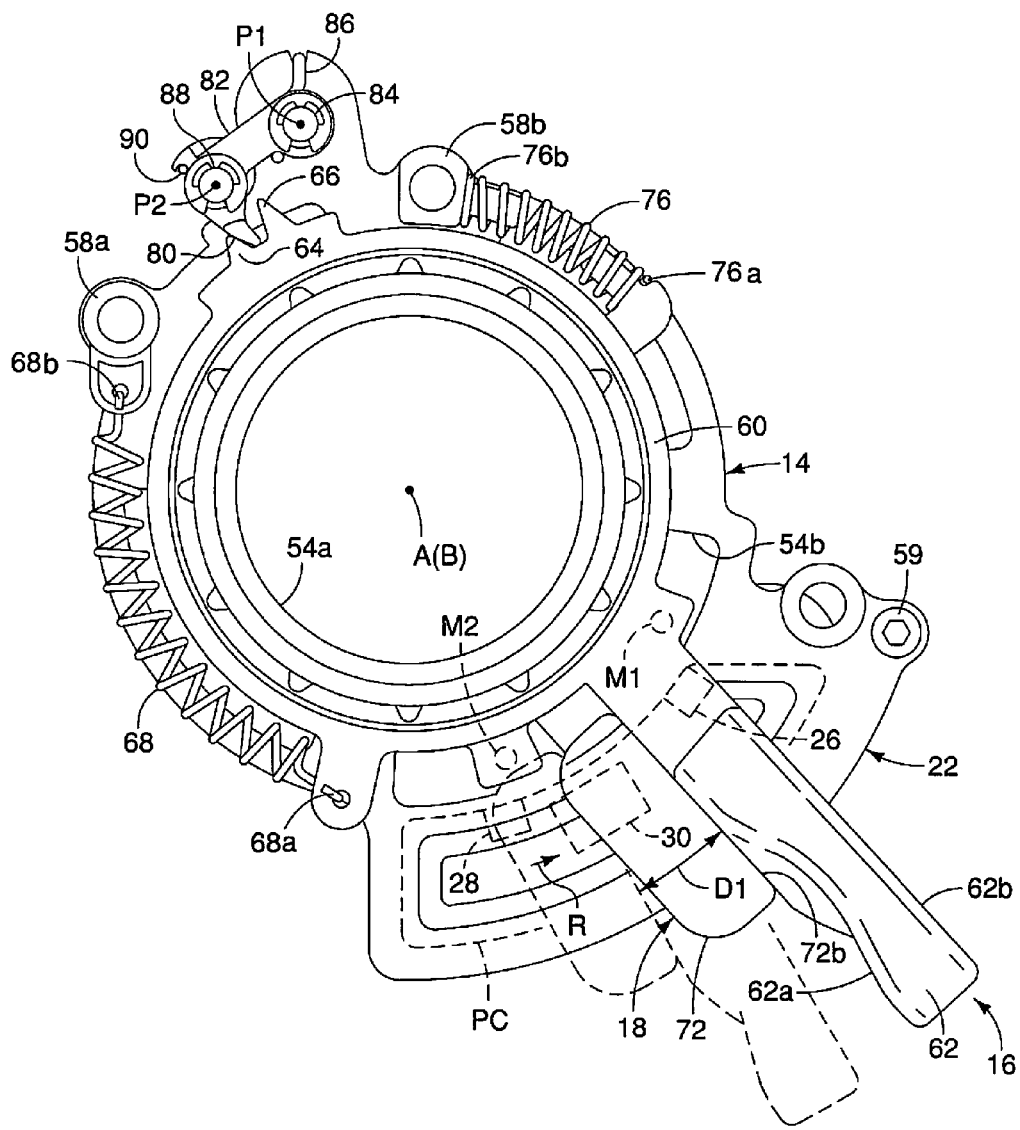
FIG. 17 is an elevational view of the selected parts of the bicycle component operating apparatus with the first and second operating members moved to an operated position.
Figure 18:
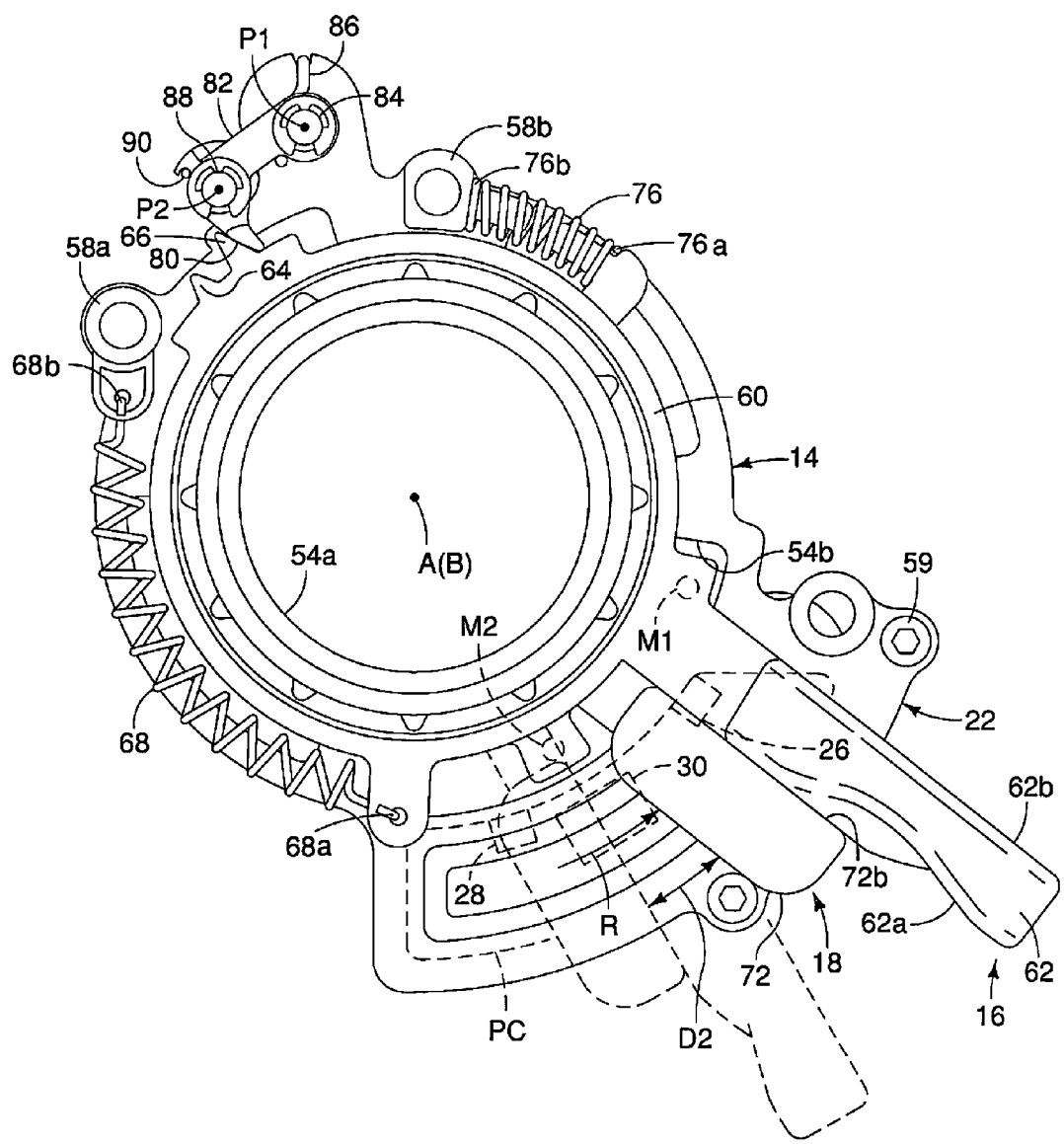
FIG. 18 is an elevational view of the selected parts of the bicycle component operating apparatus with the first and second operating members moved to an operated position that is further from the rest position than in FIG. 17.

Referring to FIGS. 14 to 18 in the illustrated embodiment, the first operating member 16 and the second operating member 18 are operated from the first rest position (FIG. 14) and the second rest position (FIG. 14), respectively, in an operating direction (i.e., a first rotational direction R) that is the same with respect to the handlebar axis A. As seen in FIGS. 15 and 16, the first operating member 16 moves (i.e., rotates) with respect to the base member 14 about the handlebar axis A, while the second operating member 18 remains stationary as the first operating member 16 is operated. On the other hand, as seen in FIGS. 17 and 18, the first operating member 16 and the second operating member 18 move together with respect to the base member 14 about the handlebar axis A as the second operating member 18 is operated.

The electric control unit 22 is operated by movement of each of the first and second operating members 16 and 18 moving from the rest position towards their operated positions, respectively. Specifically, in the illustrated embodiment, the electric control unit 22 generates shift signals as the first and third control signals in accordance with movements of the first and second operating members 16 and 18 moving from their rest positions towards their operated positions. The first control signals are used as one of an upshift signal and a downshift signal. The third control signals are used as the other of the upshift signal and the downshift signal. As described above, the first and third control signals are simultaneously generated as the second operating member 18 is operated. The main microcomputer 32 is programmed so that the main microcomputer 32 ignores the first control signal in such situation.

In the illustrated embodiment, the electric control unit 22 generates the first signal as the first operating member 16 reaches the first operated position (FIG. 16). The electric control unit 22 generates the second signal as the second operating member 18 reaches the second operated position (FIG. 18). Also the electric control unit 22 generates the third signal as the first operating member 16 reaches the first intermediate position (FIG. 15) between the first rest position (FIG. 14) and the first operated position (FIG. 16). Finally, the electric control unit 22 generates the fourth signal as the second operating member 18 reaches the second intermediate position (FIG. 17) between the second rest position (FIG. 14) and the second operated position (FIG. 18).

In one embodiment, the electric control unit 22 generates one of an upshift signal and a downshift signal as the first operating member 16 is operated in the first rotational direction R by the first movement amount D1, and generates the other of the upshift signal and the downshift signal as the first operating member 16 is operated in the first rotational direction R by the second movement amount D2. In this way, the first operating member 16 can operate the derailleur 34 for both upshifting and downshifting. In the illustrated embodiment, the first movement amount D1 is smaller than the second movement amount D2. Thus, the second movement amount D2 is different from the first movement amount D1 in the illustrated embodiment.

Alternatively, in another embodiment, the electric control unit 22 and/or the main microcomputer 32 can be selectively programmed so that the first operating member 16 can operate two separate electric shifting devices (e.g., front and rear derailleurs). For example, the electric control unit 22 generates one of an upshift signal and a downshift signal as the first operating member 16 is moved by the first movement amount D1 to operate a first electric shifting device, and generates the other of the upshift signal and the downshift signal as the first operating member 16 is moved by the second movement amount D2 to operate a second electric shifting device. Likewise, the electric control unit 22 also generates one of an upshift signal and a downshift signal as the second operating member 18 is operated in the first rotational direction R by the first movement amount D1. When the second operating member 18 is operated in the first rotational direction R by the second movement amount D2, the electric control unit 22 and/or the main microcomputer 32 can be selectively programmed so that the electric control unit 22 generates either the other of the upshift and downshift signals or a second one of the upshift and downshift signals. Moreover, the electric control unit 22 and/or the main microcomputer 32 can be selectively programmed so that the electric control unit 22 generates one of an upshift signal and a downshift signal as the first operating member 16 is operated and generates the other of the upshift signal and the downshift signal as the second operating member 18 is operated. In this way, each of the first and second operating members 16 and 18 can perform a single shift operation by being operated by the first movement amount D1 and a double shift operation by being operated by the second movement amount D2.

In the illustrated embodiment, the first mounting part 60 is rotatably supported on the base member 14 about the handlebar axis A. The first lever part 62 projects outwardly from the first mounting part 60. Preferably, the first operating member 16 is a trigger operating lever that is biased by the biasing element 68 to the rest position of the first operating member 16 with respect to the base member 14. Here, the biasing element 68 is a coil tension spring that has a first end 68a attached to the first operating member 16 and a second end 68b that is attached to the spacer 58a. Thus, when the first operating member 16 is moved from the rest position (FIG. 14) to an operated position (FIG. 15 or 16), the biasing element 68 is stretched so as to apply a biasing force on the first operating member 16. Preferably, the biasing element 68 is loaded (i.e., slightly stretched) while the first operating member 16 is in the rest position (FIG. 14).

In the illustrated embodiment, the second mounting part 70 is rotatably supported on the base member 14 about the handlebar axis A. The second lever part 72 projects outwardly from the second mounting part 70. Preferably, the second operating member 18 is a trigger operating lever that is biased by the biasing element 76 to the rest position of the second operating member 18 with respect to the base member 14. Here, the biasing element 76 is a coil compression spring that has a first end 76*a* abutting against the second operating member 18 and a second end 76*b* abutting against the spacer 58*b*. Thus, when the second operating member 18 is moved from the rest position (FIG. 14) to an operated position (FIG. 17 or 18), the biasing element 76 is compressed so as to apply a biasing force on the second operating member 18. Preferably, the biasing element 76 is loaded (i.e., slightly compressed) while the second operating member 18 is in the rest position (FIG. 14).

In the illustrated embodiment, the first lever part 62 and the second lever part 72 are offset relative to each other in a rotational direction of the first mounting part 60 and the second mounting part 70. Also the first lever part 62 and the second lever part 72 are at least partially offset relative to each other in a radial direction of the first mounting part 60 and the second mounting part 70 in the illustrated embodiment. The first lever part 62 and the second lever part 72 have different shapes and different sizes. The first lever part 62 of the first operating member 16 includes a user operating surface 62*a* and a non-user operating surface 62*b*. The user operating surface 62*a* is operated by a user as the first operating member 16 is operated. The non-user operating surface 62*b* is untouchably arranged as the first operating member 16 is operated. Likewise, the second lever part 72 of the second operating member 18 includes a user operating surface 72*a* and a non-user operating surface 72*b*. The user operating surface 72*a* is operated by a user as the second operating member 18 is operated. The non-user operating surface 72*b* is untouchably arranged as the second operating member 18 is operated.

Figure 13:
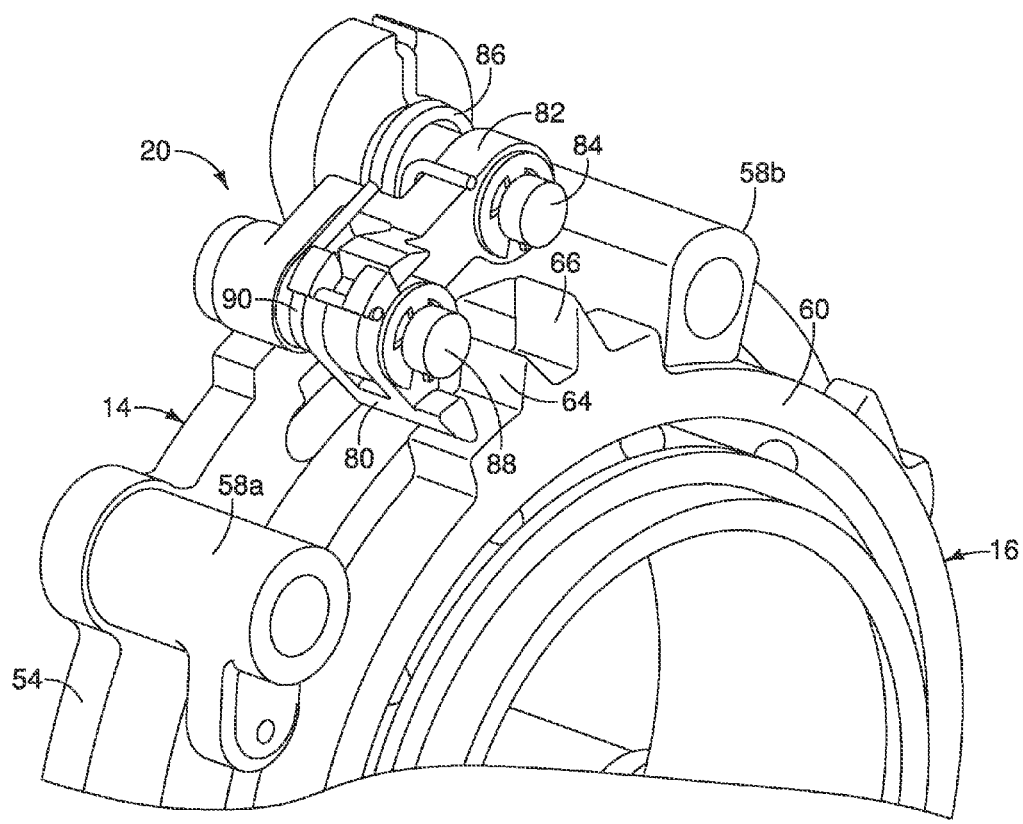
FIG. 13 is a partial perspective view of a portion of the bicycle component operating apparatus that includes a clicking mechanism.
Figure 19:
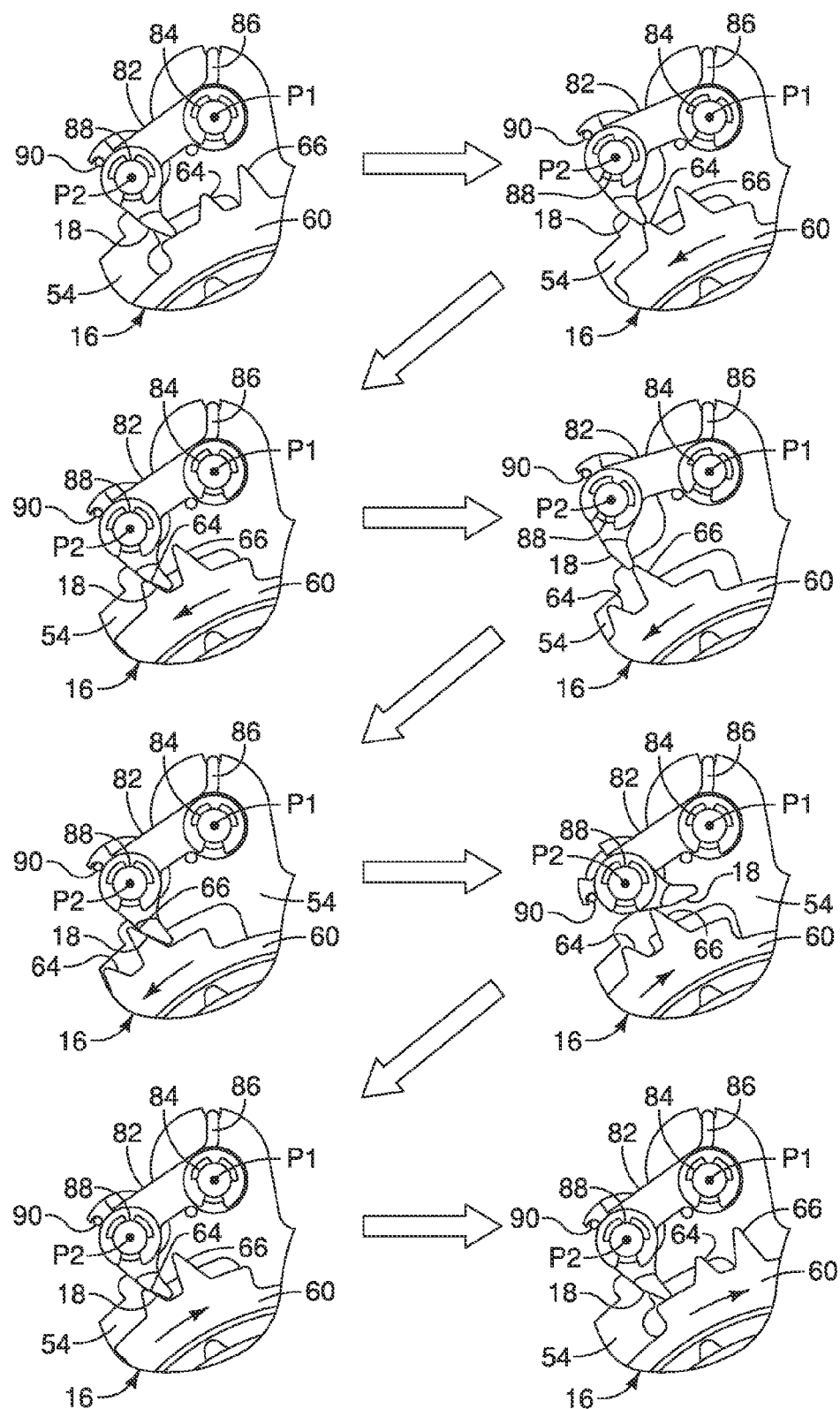
FIG. 19 is a series of partial elevational views of the clicking mechanism of the bicycle component operating apparatus being operated.

Referring to FIGS. 13, 14 and 19, the clicking mechanism 20 will be now described in more detail. In the illustrated embodiment, as best seen FIGS. 13 and 14, the clicking mechanism 20 includes a first part 80 contacting at least one of the first operating member 16 and the second operating member 18 to produce a haptic feedback response as each of the first and second operating members 16 and 18 moves from the rest position towards the operated position, respectively. In the illustrated embodiment, the first part 80 is only contacted by the first and second projections 64 and 66 of the first operating member 16 because operation of the second operating member 18 moves the first operating member 16 into contact with the first part 80. If the second operating member 18 were configured to operate independently of the first operating member 16, then the second operating member 18 would be provided with projections similar to the first and second projections 64 and 66 for contacting the first part 80. Thus, the clicking mechanism 20 of the illustrated embodiment could be used with a bicycle component operating apparatus having independently operable operating members such that the operating members all use the same clicking mechanism.

In the illustrated embodiment, the clicking mechanism 20 further includes a second part 82 pivotally mounted to the second support member 54 of the base member 14 about a first pivot axis P1. The first part 80 is pivotally mounted to the second part 82 about a second pivot axis P2. Specifically, a first pivot pin 84 is fixedly attached to the second support member 54. The first pivot pin 84 defines the first pivot axis P1. The second part 82 is pivotally mounted on the first pivot pin 84. A first biasing element 86 is operatively disposed between the second part 82 and the second support member 54. A second pivot pin 88 pivotally attached the first part 80 to the second part 82. The second pivot pin 88 defines the second pivot axis P2. A second biasing element 90 is operatively disposed between the first part 80 and the second part 82.

The second biasing element 90 applies a biasing force on the first part 80 to normally maintain the first part 80 in a predetermined orientation with respect to the second part 82 such that abutments of the first part 80 and the second part 82 abut each other. As a result, the first part 80 only moves relative to the second part 82 as the first and second projections 64 and 66 contact the first part 80 when the first operating member 16 moves from one of the operated positions towards the rest position. In the illustrated embodiment, the second biasing element 90 is a torsion spring having a coiled portion disposed on the second pivot pin 88. One end of the second biasing element 90 contacts the first part 80, while the other end of the second biasing element 90 contacts the second part 82.

The first biasing element 86 applies a biasing force on the second part 82 to bias the second part 82 such that the first part 80 normally contacts the first operating member 16. In other words, the first biasing element 86 biases the first part 80 into engagement with the first operating member 16 while the first operating member 16 is in the first rest position. As a result of this arrangement of the first and second parts 80 and 82, the first and second parts 80 and 82 move together as a unit as the first and second projections 64 and 66 contact the first part 80 when the first operating member 16 moves from the rest position towards one of the operated positions. In the illustrated embodiment, the first biasing element 86 is a torsion spring having a coiled portion disposed on the first pivot pin 84. One end of the first biasing element 86 contacts the second part 82, while the other end of the first biasing element 86 contacts the second support member 54.

Accordingly during operation of the first and second operating members 16 and 18, the first part 80 rotates about the first pivot axis P1 as each of the first and second operating members 16 and 18 moves from the rest position toward one of the operated positions, respectively. Specifically, the first part 80 contacts one or both of the first and second projections 64 and 66 of the first operating member 16 as each of the first and second operating members 16 and 18 moves from the rest position towards the operated position, respectively. The first part 80 remains stationary with respect to the second part 82 as the first part 80 and the second part 82 pivot together about the first pivot axis P1 as each of the first and second operating members 16 and 18 moves from the rest position towards the operated position, respectively.

On the other hand, during release of the first and second operating members 16 and 18, the first part 80 pivots about the second pivot axis P2, which is offset from the first pivot axis P1, as each of the first and second operating members 16 and 18 moves from one of the operated positions toward the rest position, respectively. As a result, the first part 80 moves with respect to the second part 82 about the second pivot axis P2 as each of the first and second operating members 16 and 18 moves from one of the operated positions towards the rest position, respectively.

As mentioned above, the first operating member 16 includes the first projection 64 and the second projection 66. However, alternatively, the first operating member 16 need only include at least one projection, or the first operating member 16 can include more than two projections. In any case, the number of projections will indicate the number of operated positions that can be attained with the shift operating device. The first and second projections 64 and 66 contact the first part 80 and rotates the first part 80 about the first pivot axis P1 as each of the first and second operating members 16 and 18 moves from the rest position towards the operated position, respectively. The first and second projections 64 and 66 also contact the first part 80 and pivots the first part 80 about the second pivot axis P2 as each of the first and second operating members 16 and 18 moves from the operated position towards the rest position, respectively. The first projection 64 has a first height and the second projection 66 has a second height. The first and second heights of the first and second projections 64 and 66 are different from each other. The first projection 64 is closer to the first part 80 than the second projection 66 while the first operating member 16 is at the rest position. The first height of the first projection 64 is smaller than the second height of the second projection 66. By having different heights for the first and second projections 64 and 66, the rider can better distinguish between the two operated positions.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "attached" or "attaching", as used herein, encompasses configurations in which an element directly secured to another element by affixing the element is directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Also, the terms "part," "section," "portion," "member" or "element" when used in the singular can have the dual meaning of a single part or a plurality of parts. Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. Finally, terms of degree such as "substantially", "about" and "approximately" as used herein mean an amount of deviation of the modified term such that the end result is not significantly changed.

While only a selected embodiment have been chosen to illustrate the present invention, it will be apparent to those skilled in the art from this disclosure that various changes and modifications can be made herein without departing from the scope of the invention as defined in the appended claims. For example, this invention can be applied for not only a rotary type of a bicycle electric operating device such as described in the illustrated embodiment but can also be applied to any kind of bicycle electric operating device. Moreover, the size, shape, location or orientation of the various components can be changed as needed and/or desired so long as they do not substantially affect their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiment according to the present invention are provided for illustration only, and not for the purpose of limiting the invention as defined by the appended claims and their equivalents.

What is claimed is:

1. A bicycle component operating apparatus comprising:
   at least one operating member movably supported on a base member from a rest position to an operated position, and
   a controller configured to electrically adjust the operated position of the at least one operating member for starting operation of at least one bicycle component,
   wherein the controller includes a user setting that is selected by a user as the operated position.

2. The bicycle component operating apparatus according to claim 1, further comprising:
   a position detecting member configured to detect the operated position of the at least one operating member.

3. The bicycle component operating apparatus according to claim 2, wherein
   the position detecting member includes at least one of a tactile switch, a Hall Effect sensor and a magnetoresistive sensor.

4. The bicycle component operating apparatus according to claim 2, wherein
   the position detecting member non-physically detects the operated position.

5. The bicycle component operating apparatus according to claim 4, wherein
   the position detecting member detects a strength of a magnetic field to detect the operated position.

6. The bicycle component operating apparatus according to claim 5, wherein
   the controller determines the operated position based on a level of the strength of the magnetic field.

7. The bicycle component operating apparatus according to claim 1, wherein
   the controller includes a user input to adjust a threshold value of the user setting that corresponds to the operated position, and a memory that stores the user setting of the threshold value as the operated position.

8. The bicycle component operating apparatus according to claim 2, wherein
   the position detecting member includes a first sensor that detects a first operating member of the at least one operating member and a second sensor that detects a second operating member of the at least one operating member.

9. The bicycle component operating apparatus according to claim 8, wherein
the first and second sensors are Hall Effect sensors.

10. The bicycle component operating apparatus according to claim 8, wherein
the position detecting member further includes a third sensor that detects the first and second operating members.

11. The bicycle component operating apparatus according to claim 10, wherein
the first and second sensors are Hall Effect sensors, and the third sensor is a magnetoresistive sensor.

12. The bicycle component operating apparatus according to claim 8, wherein
the controller places the second sensor in a sleep mode based on a movement of the first operating member.

13. The bicycle component operating apparatus according to claim 10, wherein
the controller places the second and third sensors in a sleep mode based on a movement of the first operating member.

14. The bicycle component operating apparatus according to claim 12, wherein
the second operating member moves the first operating member as the second operating member is moved.

15. The bicycle component operating apparatus according to claim 13, wherein
the second operating member moves the first operating member as the, second operating member is moved.

16. The bicycle component operating apparatus according to claim 10, wherein
the controller is configured to electrically adjust a plurality of the input positions of the first and second operating members, respectively.

17. The bicycle component operating apparatus according to claim 16, wherein
the controller determines whether the first operating member is in a first input position or a second input position based on a signal from the third sensor.

18. The bicycle component operating apparatus according to claim 17, wherein
the controller determines whether the second operating member is in a third input position or a fourth input position based on a signal from the third sensor.

19. A bicycle component operating apparatus comprising:
a first sensor configured to detect an input position of a first operating member;
a second sensor configured to detect an input position of a second operating member; and
a controller placing the second sensor in a sleep mode until a movement of the first operating member is detected by the first sensor.

20. The bicycle component operating apparatus according to claim 19, wherein
the first and second sensors are non-physically contacts to the first and second operating members.

21. The bicycle component operating apparatus according to claim 19, wherein
the first and second sensors are Hall Effect sensors.

22. The bicycle component operating apparatus according to claim 19, further comprising:
a third sensor that detects the first and second operating members.

23. The bicycle component operating apparatus according to claim 22, wherein
the controller places the third sensor in a sleep mode based on the movement of the first operating member.

24. The bicycle component operating apparatus according to claim 22, wherein
the controller places the third sensor in a sleep mode until the first sensor detects movement of the first operating member.

25. The bicycle component operating apparatus according to claim 22, wherein
the controller placing the third sensor in a sleep mode until the first sensor detects the input position of the first operating member.

26. The bicycle component operating apparatus according to claim 22, wherein
the first and second sensors are Hall Effect sensors, and the third sensor is a magnetoresistive sensor.

27. The bicycle component operating apparatus according to claim 19, wherein
the second operating member moves the first operating member as the second operating member is moved.

28. The bicycle component operating apparatus according to claim 22, wherein
the controller determines whether the first operating member is in a first input position or a second input position of the first operating member based on a signal from the third sensor.

29. A bicycle component operating apparatus comprising: a first sensor configured to detect an input position of a first operating member; a second sensor configured to detect an input position of a second operating member; and a controller placing the second sensor in a sleep mode until the first sensor detects the input position of the first operating member.

* * * * *